(12) United States Patent
Kishikawa et al.

(10) Patent No.: US 8,280,105 B2
(45) Date of Patent: Oct. 2, 2012

(54) IMAGING POSITION ANALYZING METHOD

(75) Inventors: Kiyonari Kishikawa, Kasuga (JP);
Kouhei Tou, Kasuya-gun (JP); Toru Irie, Fukuoka (JP)

(73) Assignee: GEO Technical Laboratory Co., Ltd., Fukuoka (JP)

( * ) Notice: Subject to any disclaimer, the term of this patent is extended or adjusted under 35 U.S.C. 154(b) by 986 days.

(21) Appl. No.: 11/918,518

(22) PCT Filed: Mar. 17, 2006

(86) PCT No.: PCT/JP2006/305412
§ 371 (c)(1),
(2), (4) Date: Nov. 20, 2008

(87) PCT Pub. No.: WO2006/114955
PCT Pub. Date: Nov. 2, 2006

(65) Prior Publication Data
US 2009/0080697 A1    Mar. 26, 2009

(30) Foreign Application Priority Data
Apr. 25, 2005   (JP) ................................ 2005-126401

(51) Int. Cl.
*G06K 9/00* (2006.01)
*G08G 1/123* (2006.01)

(52) U.S. Cl. .................. 382/103; 382/154; 340/995.14; 340/990

(58) Field of Classification Search .......... 382/103–104, 382/154; 701/201, 208, 209, 210, 211; 340/990, 340/995; 345/427, 852
See application file for complete search history.

(56) References Cited

U.S. PATENT DOCUMENTS

| 5,739,848 | A | * | 4/1998 | Shimoura et al. | 348/119 |
| 6,098,016 | A | * | 8/2000 | Ishihara | 701/420 |
| 6,285,393 | B1 | * | 9/2001 | Shimoura et al. | 348/119 |

(Continued)

FOREIGN PATENT DOCUMENTS

JP    03-220410    9/1991

(Continued)

OTHER PUBLICATIONS

Zhencheng Hu, Uchimura Keiichi, Hanqing Lu, Francisco Lamosa, "Fusion of Vision, 3D Gyro and GPS for Camera Dynamic Registration," icpr, vol. 3, pp. 351-354, 17th International Conference on Pattern Recognition (ICPR'04)—vol. 3, 2004.*

(Continued)

*Primary Examiner* — Vu Le
*Assistant Examiner* — Andrae S Allison
(74) *Attorney, Agent, or Firm* — Beyer Law Group LLP

(57) ABSTRACT

The imaging position of each of the frames in image data of a plurality of frames captured while a vehicle is traveling is accurately determined. An image data acquiring device captures a front image by means of a video camera while a vehicle is traveling. When in imaging, the device associates the vehicle speed pulse detected by a vehicle speed sensor with the frame data and records them. An image data processing device arranges data on each frame of the image along the initial path according to the correspondence with the vehicle speed pulse. The device determines the variation between the frames of a feature point such as a road lane marking included in the image, reflects the variation on the initial path, and corrects the errors in the direction perpendicular to the moving direction so as to determine the traveling path and imaging positions of the frames.

13 Claims, 19 Drawing Sheets

U.S. PATENT DOCUMENTS

| | | | |
|---|---|---|---|
| 6,360,168 B1 * | 3/2002 | Shimabara | 701/436 |
| 6,594,583 B2 * | 7/2003 | Ogura et al. | 701/301 |
| 6,622,085 B1 * | 9/2003 | Amita et al. | 340/995.14 |
| 7,343,268 B2 * | 3/2008 | Kishikawa | 703/1 |
| 2004/0056778 A1 * | 3/2004 | Hilliard | 340/933 |

FOREIGN PATENT DOCUMENTS

| | | |
|---|---|---|
| JP | 07-037065 | 2/1995 |
| JP | 07-071973 | 3/1995 |
| JP | 2000-276697 | 10/2000 |
| JP | 2002-148064 | 5/2002 |
| JP | 2004-045227 | 2/2004 |

OTHER PUBLICATIONS

Y. Meng, et al., "A Simplified Map-Matching Algorithm for In-Vehicle Navigation Unit", Journal of Geographic Information. Sciences, vol. 8, No. 1, pp. 24-30, (2002).*

* cited by examiner

IMAGING POSITION ANALYZING METHOD

BACKGROUND OF THE INVENTION

1. Field of the Invention

The present invention relates to a technique of analyzing the imaging position of each of multiple frames constituting an image, for example, a moving image, captured by a traveling vehicle.

2. Background Art

Various applications have been proposed for images captured with a video camera mounted on a vehicle. For example, information on these captured images is utilized for generation of electronic map data, which provides a three-dimensional map reproducing the town as a three-dimensional image based on computer graphics. The technique disclosed in Japanese Patent Laid-Open No. H07-37065 (Patent Document 1) combines multiple frame images captured with a video camera and generates one composite image covering a wide area. The generated composite image may be utilized for monitoring, for example, the status of the railway track or the status of the power cable.

For such applications of the images captured with the video camera, it is essential to accurately detect the imaging position of each frame image, for example, as latitude/longitude coordinates. The techniques disclosed in Japanese Patent Publication No. 2687645 (Patent Document 2) and in Japanese Patent Laid-Open No. 07-71973 (Patent Document 3) identifies the position of the vehicle in its moving direction by utilizing a known distance, for example, the number of intermittent white lines provided as a road lane marking or the number of posts of a guardrail. The combined use of a GPS (global positioning system), a gyroscope, or another positioning sensor for the detection of the vehicle position has also been proposed.

SUMMARY OF THE INVENTION

These prior techniques, however, have rather insufficient positioning accuracy of the imaging position of the image. The imaging position is to be specified by at least two-dimensional coordinates, for example, latitude/longitude coordinates. The techniques disclosed in Patent Documents 2 and 3 improve the positioning accuracy of the vehicle in its moving direction but do not sufficiently take into account the positioning accuracy in a perpendicular direction intersecting with the moving direction. The position detected by the GPS includes an error of several ten meters and does not have a sufficient accuracy for various analyses based on the image data. The position detected by the gyroscope also has only an insufficient accuracy.

The time data of the GPS also includes an error. Even minimization of the error in position detection accordingly does not allow perfect synchronization with the corresponding captured image. The imaging position of the image is thus not identifiable with a sufficient accuracy. There is a possibility that the position identified by the GPS at a certain time point actually represents the position at a different time point. Even improvement in accuracy of position detection by the GPS does not ensure the position detected by the GPS during traveling represents the imaging position with a sufficient accuracy.

The low accuracy of the imaging positions does not allow effective analysis of even high-resolution image data. The inaccurate analysis of the imaging positions leads to failure in accurate identification of the shapes and the positions of road indications, road signs, and building constructions included in the captured image, which is essential for generation of reliable map data. In the case of image composition by the technique disclosed in Patent Document 1, the low accuracy of the imaging positions causes a positional misalignment between multiple frame images. The resulting composite image does not have high definition even when original frame images have a sufficiently high resolution.

These problems are not characteristic of the images taken with the video camera mounted on the vehicle but are commonly found in images taken during moving, for example, images taken by a walking person. These problems arise with regard to not only a moving image but still images taken at multiple different positions. There is accordingly a demand of accurately identifying an imaging position of each of multiple frames constituting an image captured during moving.

One aspect of the invention is an imaging position analyzing device (hereafter may be simply referred to as 'analyzing device') that analyzes an imaging position of each of multiple frames constituting an image. A processing object of the imaging position analyzing device is the image captured at preset imaging timings during traveling with a substantially fixed attitude angle relative to ground surface. One typical example of the image as the processing object is a moving image captured by a moving vehicle equipped with an imaging device fastened at a fixed attitude angle. This is, however, not restrictive but the image may be captured by a pedestrian walking with holding an imaging device at a substantially fixed attitude angle. The moving image is not essential but may be replaced by a set of still images captured at multiple different locations. Each of the multiple frames of the image includes a predetermined continuum captured commonly in at least one of adjacent frames immediately before and after the each frame. The continuum may not be included in all the multiple frames of the image as the processing object. One typical example of the continuum is a road lane marking.

The analyzing device inputs image data of the multiple frames, and also inputs an initial path of the traveling during imaging as an initial value of analysis. On the assumption that the image is captured during the traveling along this initial path, the multiple frames of the image are locatable on the initial path. The analyzing device tentatively sets imaging positions of the respective frames corresponding to the preset imaging timings along a moving direction of the initial path. The initial path includes some errors of the imaging positions, so that there is a positional misalignment of the continuum between captured images of plural frames located on the initial path.

The analyzing device performs a series of image processing to detect the positional misalignment of the continuum between the captured images of the plural frames and corrects the tentatively set imaging positions in a perpendicular direction intersecting with the moving direction of the initial path based on the detected positional misalignment, so as to implement analysis of the imaging position of each frame. For example, when the position of the continuum in one frame is varied rightward from the position in a previous frame, the tentatively set imaging position is corrected to be shifted leftward according to the variation. When the position of the continuum in one frame is varied leftward, on the other hand, the tentatively set imaging position is corrected to be shifted rightward. The imaging position analyzing device according to one aspect of the invention performs the image analysis of the captured continuum to identify an error of the initial path in the perpendicular direction. By reflection of the identified error, the imaging position analyzing device enables accurate detection of an actual traveling path during imaging (hereafter referred to as 'actual path') or accurate identification of the imaging position of each frame. Adoption of the image analysis for detection of the actual path advantageously ensures the position accuracy corresponding to the resolution of the image. Even when the detected actual path includes some positional error, there is a sufficiently high consistency among the multiple frames of the image. This arrangement effectively ensures the accuracy required for generation of map data based on the image of the multiple frames or diversity of other analyses.

The image is required to at least partly include a front site or a back site in the moving direction. For example, the image may be taken with a camera installed to face diagonally forward or diagonally backward. The image may be taken with a sufficiently wide-angle camera installed to face right beside relative to the moving direction. A front image or a back image in the moving direction is preferable for the most efficient and accurate detection of a positional misalignment in the perpendicular direction. Only a lower image part of the image, instead of the whole image, may be used for the analysis of the imaging position. The lower image part generally captures a site relatively close to the imaging position and is thus suitable for the enhanced accuracy of the analysis of the imaging position.

The continuum used for detection of the actual path may be any of various subjects captured over plural frames. Although a large-sized vehicle, such as a bus or a truck, traveling in the neighborhood may be used as the continuum, it is necessary to assure that the continuum does not move in the perpendicular direction. From this point of view, the continuum is preferably an object fastened to the road, for example, a guardrail on the roadside or an edge of a building construction. For the relatively easy and accurate image recognition, a preferable example of the continuum is a road lane marking.

Various procedures may be adopted for arrangement of the multiple frames on the initial path. One preferable procedure inputs moving distance information representing a relation between a moving distance in the moving direction and an imaging time, and tentatively sets the imaging positions of the respective frames along the moving direction based on the input moving distance information. Since the imaging time of each frame is known, the imaging position of each frame on the initial path is accurately identified according to the moving distance information. This desirably enhances the accuracy of eventually obtained two-dimensional coordinates of the imaging position.

Another preferable procedure extracts frames captured at intervals of a preset moving distance among the multiple frames based on the input moving distance information and uses the extracted frames for the analysis of the imaging position of each frame. There is a fixed moving distance between the extracted frames. This advantageously facilitates subsequent image processing, such as composition of the multiple frames. In this application, it is desirable to have a sufficiently large number of frames captured per unit time (hereafter referred to as 'frame rate') and assure the presence of one frame in every preset moving distance. The required frame rate depends upon the moving speed during imaging and the moving distance as the base of frame extraction. For example, when the image is taken with an imaging device mounted on a vehicle traveling at a limiting speed on the general road, a moving image having a frame rate of 30 frames/second satisfies the above requirement.

The moving distance information may be information on a captured image of objects appearing at known intervals, for example, posts of a guardrail or lane markings intermittently drawn on the road surface. In the came of image capture by an imaging device mounted on a vehicle, the moving distance information may be a vehicle speed pulse of the vehicle, that is, a pulse signal output at intervals when the vehicle moves every preset distance.

It is desirable to further record reference position information in correlation to the image data, where the reference position information represents a time point of reaching a preset reference position, for example, a preset intersection, during imaging. The analyzing device can thus identify an imaging position at an imaging time corresponding to the reference position information (hereafter this imaging position is referred to as 'reference position'). This enables initialization of at least a location along the moving direction in the course of the analysis based on this reference position information, thus desirably enhancing the positioning accuracy of the imaging position.

The reference position information may be used in various applications. In one application, frames are sequentially arranged in the imaging order from the reference position as the starting point. Namely the frames are located in time series along the moving direction during imaging. In another application, frames are sequentially arranged in reverse to the imaging order from the reference position as the starting point. Namely the frames are located in reverse to the time series, that is, in a reverse direction opposed to the moving direction during imaging. In both of these applications of frame arrangement, the frame closer to the starting point has the higher positioning accuracy.

In a navigation system, captured frame images or graphics generated according to the captured frame images may be displayed according to the varying position of the traveling vehicle. In the latter application of arranging the frames in reverse to the time series from the reference position as the starting point, the captured image has the higher position accuracy when the vehicle moves closer to the reference position. Since the vehicle frequently stops and turns at intersections, it is preferable to increase the position accuracy of the captured image at the location closer to an intersection used as the reference position. The latter application is thus especially effective for generation of navigation data.

In the processing of a captured image of the road having multiple opposed lanes, the sequential arrangement of frame data in reverse to the time series from the reference position as the starting point is suitable for a captured image of a lane on only one single side (generally the lane where the vehicle travels during imaging). The sequential arrangement of frame data in both the moving direction and the reverse direction from the reference position as the starting point is suitable for a captured image of lanes on both the sides.

One applicable procedure for initialization of the imaging position takes side image data of plural frames in the perpendicular direction. The side image data may be obtained as an image captured with a camera installed to face right beside relative to the moving direction of the vehicle. The side image data includes a subject having position coordinates known by referring to map data. The imaging position analyzing device of this application computes subject coordinates representing a location of the subject from the side image data of the plural frames. The side image data of the plural frames are equivalent to image data of the subject captured at plural different imaging positions. The moving distance and the imaging time of each frame determine a distance between the plural imaging positions. The position coordinates of the subject are thus identifiable from the imaging position as the base according to the principle of triangulation. A difference between the computed subject coordinates and the position coordinates recorded in the map data represents an error of the imaging position used for computation of the subject coordinates. The imaging position is initialized to correct the error, based on this difference.

The initial path is used as the initial value of the analysis of the captured image and is thus required to represent only the outline of the traveling path during imaging. For example, in an application of referring to road network data representing each road as a combination of nodes and links, the initial path is set by specification of a set of nodes and links, based on the road network data. By referring to road network data having altitude information of each road, the initial path may be specified three-dimensionally.

In another application, the initial path may be set based on output of a position detection sensor. The position detection sensor used here is required to at least two dimensionally detect the traveling path during imaging in a preset allowable error range and is, for example, a gyroscope, an odometer, or a GPS. The allowable error range is set to enable correction of the error of the initial path in the perpendicular direction by image processing. The allowable error range is preferably set to restrict a difference between the initial path and the actual path within an angle of view of the imaging device.

One preferable embodiment of the imaging position analyzing device converts the image data into a front captured image of the predetermined continuum, prior to the analysis of the imaging position. Various techniques, for example, affine transform, may be adopted for conversion of the image data. For the enhanced accuracy of the image data conversion, one preferable procedure divides the image data into multiple regions and adopts different conversion factors in the respective multiple regions to convert the image data. The multiple regions and the conversion factors are set to obtain a front view image of a preset reticulate pattern from image data of the reticulate pattern having a known shape.

Another aspect of the invention is an image data acquiring device that generates the image data used for the analysis of the imaging position described above. One preferable configuration of the image data acquiring device includes a vehicle that travels on a ground surface, an imaging device, and a moving distance information recorder. The imaging device is attached to the vehicle with a substantially fixed attitude angle relative to the vehicle and captures an image of multiple frames, for example, a moving image or a set of still images, at preset timings. The vehicle may be equipped with one or plural imaging devices, in addition to this imaging device. The moving distance information recorder records moving distance information, which represents moving of the vehicle by a predetermined distance, in correlation to a time of the image capture. The moving distance information is, for example, the vehicle speed pulse output from the vehicle. The image data adequate for the analysis of the imaging position and the moving distance information are supplied to the imaging position analyzing device described above.

It is not essential for the technique of the invention to possess all of the above features and characteristics simultaneously. Part of these features and characteristics may be omitted when not required, or these features and characteristics may be combined adequately according to the requirements. The technique of the invention is not restricted to the imaging position analyzing device or the image data acquiring device described above but may be actualized by diversity of other applications, for example, a computer-aided imaging position analyzing method, a computer program for such imaging position analysis, and a recording medium with such a computer program recorded therein. Available examples of the recording medium include flexible disks, CD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

DESCRIPTION OF THE PREFERRED EMBODIMENTS

Figure 1:
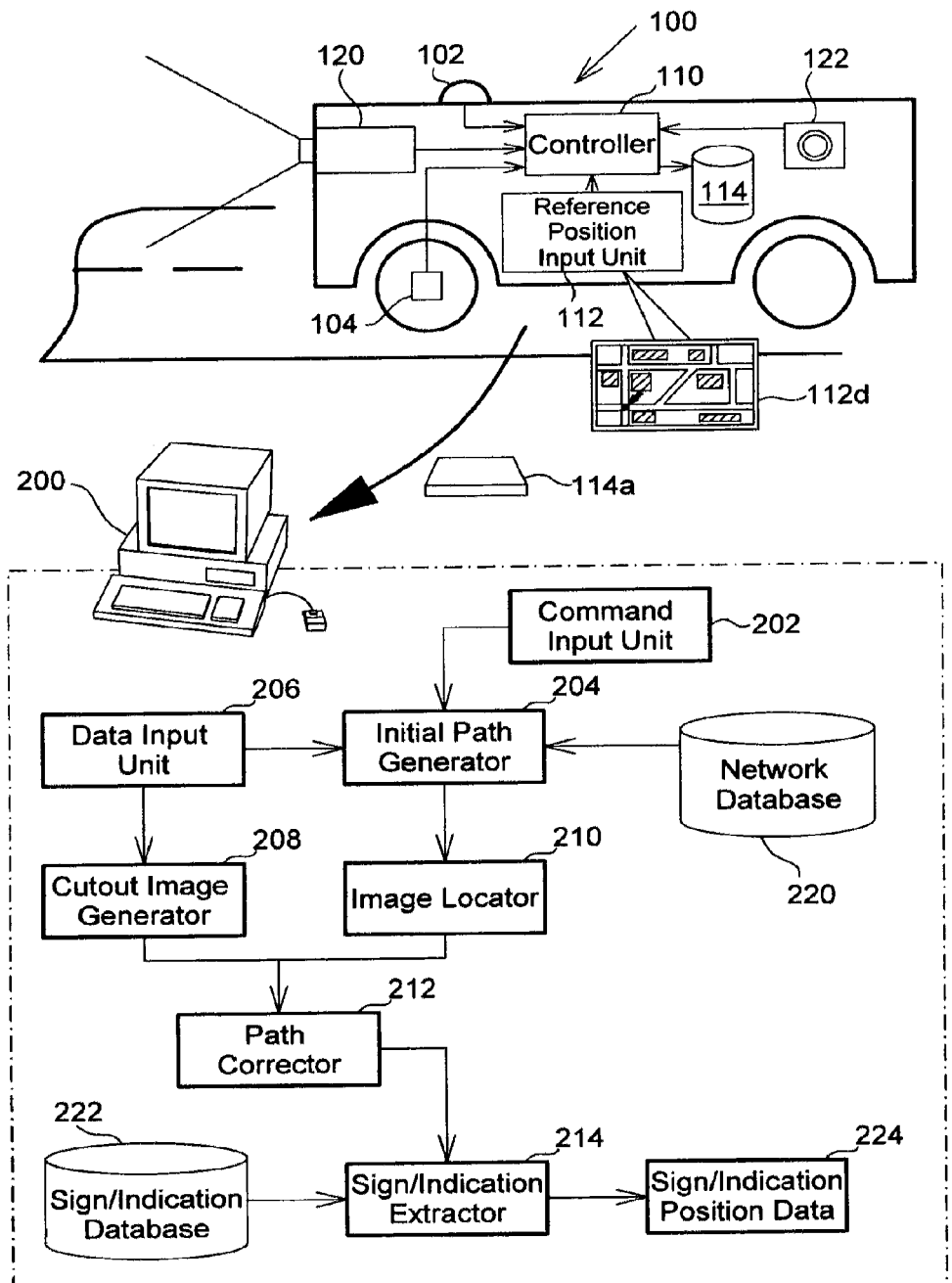
FIG. 1 schematically illustrates the configuration of an image data processing system in one embodiment of the invention.

Some modes of carrying out the invention are described below in the following sequence:
A. System Configuration
B. Data Structure
C. Principle of Imaging Position Analysis
C-1. Initial Path
C-2. Feature Point Tracking Process
D. Imaging Position Analyzing Process
E. Sign/Indication Extraction Process
F. Concrete Examples
G1. Modified Example: Arrangement of Frame Data
G2. Modified Example: Utilization of Side Image
G3. Modified Example: Detection of Time Change
G4. Modified Example: Analysis of Guide Plate Position Coordinates A. System Configuration FIG. 1 schematically illustrates the configuration of an image data processing system in one embodiment of the invention. The image data processing system processes a moving image captured by a traveling vehicle on the road. The series of processing performed by the image data processing system includes an imaging position analyzing process that analyzes and specifies the coordinates of an imaging position, for example, latitude and longitude (lat/long) coordinates, with regard to each of multiple frames constituting a moving image. The series of processing also includes a process of generating a composite image of the respective frames based on the results of the analysis (hereafter this process is referred to as 'image composition process') and a process of identifying and locating indications on the road surface and signs along the road from the composite image as base data for generation of three dimensional map data (hereafter this process is referred to as 'sign/indication extraction process). The moving image captured at the imaging position analyzed by the imaging position analyzing process may be utilized for measurement of the height and the width of each building construction along the road.

The image data processing system includes an image data acquiring device 100 for capturing a moving image and an image data processing device 200 for processing the captured moving image. The capturing function and the processing function are implemented by two separate devices in the arrangement of this embodiment but may be implemented by one integral device. The image data processing device 200 may be constructed as a distributed processing system of multiple processing devices.

In the structure of this embodiment, the image data acquiring device 100 has multiple components mounted on a vehicle. The vehicle is equipped with a video camera 120 for capturing front images and a video camera 122 for capturing side images. The video cameras 120 and 122 are fastened to hold predetermined attitude angles relative to the vehicle. For the efficient acquisition of high-definition images in a wide angle, high-definition wide-angle cameras are desirable for the video cameras 120 and 122.

The image captured by the video camera 120 is utilized for the imaging position analyzing process as described later. The video camera 120 is thus preferably located to have an attitude angle that is along the longitudinal axis of the vehicle and is parallel to the road surface during the travel of the vehicle. This attitude angle is, however, not restrictive. The imaging position analyzing process requires the image at least partly capturing a front area ahead of the vehicle or a rear area behind the vehicle. As long as this condition is satisfied, the video camera 120 may be located in any desired direction, for example, backward, diagonally forward, or diagonally backward. The video camera 120 having a super wide angle imaging capability may face even sideways.

The side images are utilized for various applications, for example, extraction of road signs and indications and measurement of the height and the width of each building construction. The number of the video cameras 122 and their installation positions and directions are adequately determined according to the type and the purpose of such applications.

The vehicle is further equipped with a hard disk 114 for storage of acquired data as digital image data and a controller 110 for controlling the data storage. The controller 110 may be constructed by installing a computer program for the image data acquisition and management functions in a general-purpose computer.

A GPS (global positioning system) 102 periodically detects positional information, that is, latitude and longitude (lat/long), of the vehicle at each imaging time and outputs the detected positional information with its detection time. The detected positional information with the detection time is stored with corresponding image data in the hard disk 114. The output of the GPS 102 is, however, not essential for analysis of the imaging position as mentioned later. The GPS 102 may thus be omitted from the imaging data acquiring device 100 when not required. A vehicle speed sensor 104 outputs a pulse signal as a vehicle speed pulse at intervals when the vehicle moves every preset distance. The vehicle speed pulse is also stored with corresponding image data into the hard disk 114.

For the enhanced accuracy of analysis of the imaging position, when the vehicle during imaging passes through a certain reference position expressed by a combination of known lat/long, the time of passage and information of the reference position are recorded in the structure of the embodiment. The vehicle is equipped with a reference position input unit 112 for recording the passage time and the information of the reference position in response to the operator's instruction. Like the controller 110, the reference position input unit 112 may be constructed by installing a computer program for the reference position input function in the general-purpose computer.

When the operator clicks an object reference position to be recorded with a mouse or another pointing device on a map 132d displayed on a screen, the operator's click time and the information of the reference position are recorded. Map data required for display of the map may be stored in advance in the hard disk 114 or in a recording medium, such as a CD-ROM, or may be obtained from an external server via a wireless network. The input method of the reference position information is not restricted to the operator's click. The operator may operate a keyboard to directly enter the information of the reference position, for example, latitude and longitude (lat/long) coordinates. When object reference positions to be recorded are specified in advance, the operator may enter a code allocated to each of the object reference positions. Another modified procedure may omit the entry of the information of the reference position during imaging but accept only the entry of the passage time.

In the structure of this embodiment, the controller 110 and the reference position input unit 112 are attained by the installed computer program as the software configuration. The controller 110 and the reference position input unit 112 may alternatively be attained by a specific circuit structure as the hardware configuration.

The following description regards the structure of the image data processing device 200. The image data processing device 200 may be constructed by installing a computer program for the image data processing function in a general-purpose computer. Data are transferred from the image data acquiring device 100 to the image data processing device 200 by means of a removable hard disk 114a. This method is, however, not restrictive, but data may be transferred by means of a DVD or another recording medium or may be transferred via a network.

As illustrated, the installed computer program enables various functional blocks in the image data processing device 200. At least part of these functional blocks may be attained by ASIC (application specific integrated circuits) as the hardware configuration.

A data input unit 206 inputs the image data generated by the image data acquiring device 100. As mentioned previously, the lat/long detected by the GPS 102, the vehicle speed pulse, and the information of the reference position are input together with the image data. The input pieces of information are transmitted to an initial path generator 204 and a cutout image generator 208.

The initial path generator 204 generates an initial path that is used in the imaging position analyzing process as described later. A command input unit 202 inputs commands required for generation of the initial path through the operator's operations of the mouse and the keyboard. The commands input by the operator are transmitted to not only the initial path generator 204 but other relevant functional blocks according to the requirements. For the simplicity of illustration, the arrow of data transmission from the command input unit 202 is drawn only to the most relevant initial path generator 204.

Two different methods may be adopted for generation of the initial path. One method utilizes lat/long data obtained by the GPS 102. The other method does not use the positional information obtained by the GPS 102 but utilizes road network data for generation of the initial path. The road network data, used for route search, represent the road by a combination of links expressing the route of the road as broken lines, nodes expressing the intersections and the end points of the respective links, and attribute information of the links and the nodes. The road network data are stored as a network database 220 in the image data processing device 200. The network database 220 may alternatively be provided from a recording medium, such as a CD-ROM, or from an external server connected via the network.

An image locator 210 identifies the imaging position of each frame included in the image data according to the generated initial path. Each frame is locatable on the initial path by identification of its imaging position. In the specification hereof, the process of identifying the imaging position may thus be referred to as the 'locating process'. The position identified here includes some error and is used as an initial value of the imaging position analyzing process. The vehicle speed pulse and the information of the reference position are utilized for identification of the imaging position. The process of identifying the imaging position will be described later in detail.

The imaging position analyzing process of the embodiment uses only part of the input image data. The cutout image generator 208 cuts out a required image part for the imaging position analyzing process from each frame of the input image. One preferable procedure corrects distortions existing in the image captured in a wide angle by affine transform or another suitable technique. The image cutout is not an essential step but the overall image in each frame may be utilized for the imaging position analyzing process. In the latter case, the cutout image generator 208 may be omitted or may be designed to perform only the correction of the distortions existing in the captured image.

A path corrector 212 locates multiple cutout images on the initial path and corrects the initial path by a series of image processing to keep the continuity of the multiple cutout images. The process of correcting the initial path will be described later in detail. The correction of the initial path enables determination of the accurate imaging position of each frame. The image data processing device 200 may terminate the series of image data processing after output of the imaging position determined by the path corrector 212.

The image data processing device 200 performs the sign/indication extraction process, based on the processing result. The sign/indication extraction process generates a composite image as composition of images in multiple frames and identifies the appearance and the position of each indication on the road or each sign on the road based on the generated composite image. The appearance and the position of each sign/indication are identified by a sign/indication extractor 214. Signs/indications as objects of such identification include, for example, pedestrian crossings, arrows representing the restriction of road lanes, traffic lights, road signs, and street trees. Such signs and indications respectively have basic appearances and colors. The basic appearances and colors of the respective signs and indications are stored as base patterns in a sign/indication database 222.

The sign/indication extractor 214 extracts a matching image, which matches with one of the base patterns stored in the sign/indication database 222, from the composite image, modifies the extracted base pattern to determine the precise appearance of the sign/indication fit for the composite image, and identifies the location of the sign/indication. The image data processing device 200 manages the determined appearance and the identified position of each sign/indication as sign/indication position data 224. The sign/indication position data 224 is effectively used for creation of a real three-dimensional map.

Figure 2:
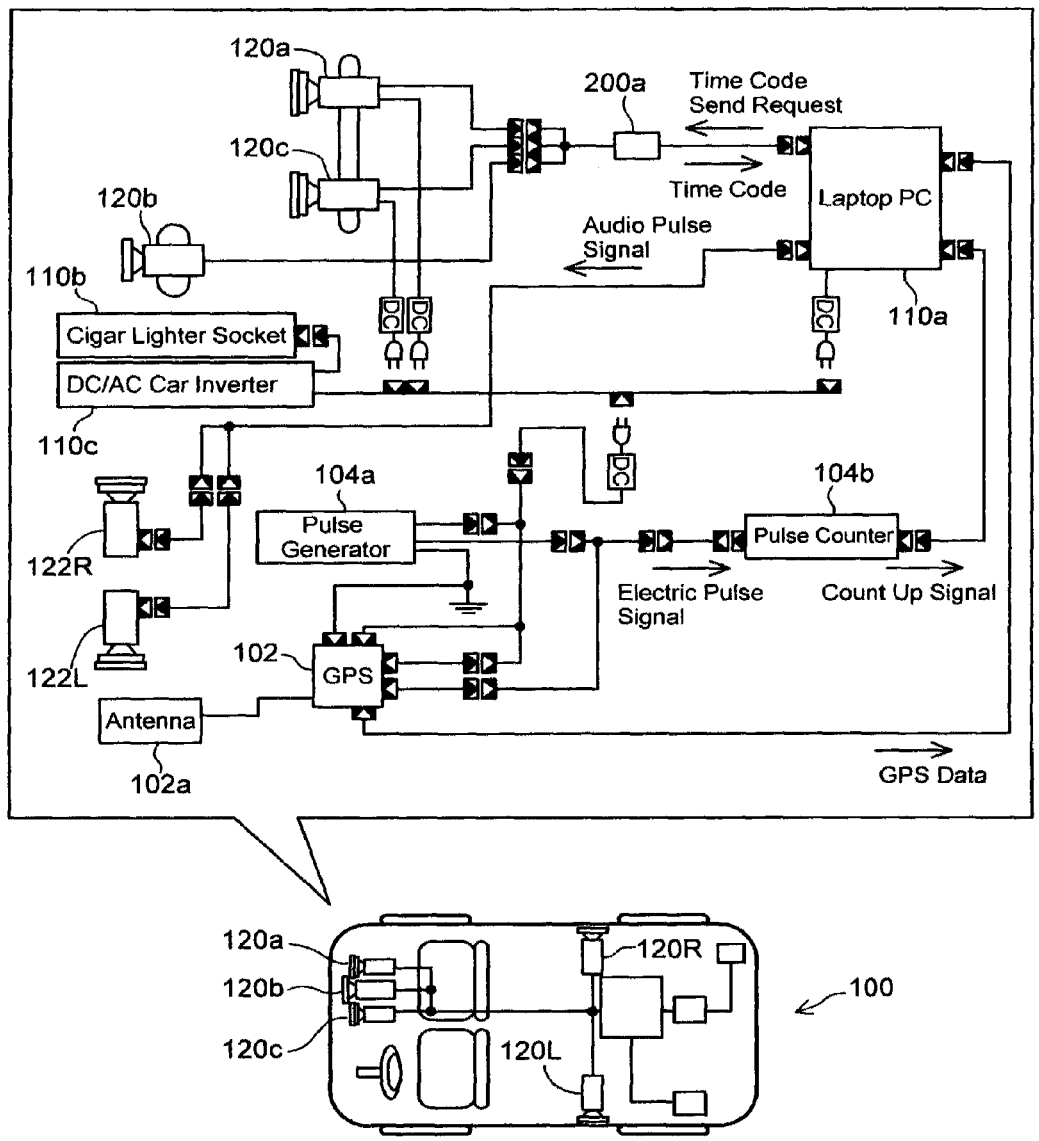
FIG. 2 shows the layout and the connection of multiple components of an image data acquiring device 100 in the image data processing system.

FIG. 2 shows the layout and the connection of the respective components of the image data acquiring device 100. These components are detachably mounted on the vehicle. The DC power supply taken from a battery mounted on the vehicle via a cigar lighter socket 110b is converted into AC power supply by a DC-AC car inverter 110c and is used as the powers of the respective components. The functions of the controller 110 and the removable hard disk 114a shown in FIG. 1 are implemented by a laptop PC 110a. The laptop PC 110a inputs the detection signals of the GPS 102. An antenna 102a of the GPS 102 is located in an area of coverage of GPS radio waves.

In the illustrated structure of FIG. 2, the vehicle is equipped with three video cameras 120a, 120b, and 120c for capturing front images. The video camera 120b is exclusively used for imaging directional road signs. The video cameras 120a, 120b, and 120c are connected to the laptop PC 110a via an IEEE interface 200a. A time code representing the imaging time of each frame is sent from the video cameras 120a, 120b, and 120c to the laptop PC 110a. The laptop PC 110a stores the received time code in correlation to the vehicle speed pulse and the information of the reference position for the analysis of the imaging position.

The vehicle is also equipped with two video cameras 122R and 122L for capturing side images on the right and on the left of the vehicle. Audio inputs of the video cameras 122R and 122L are connected to an audio output of the laptop PC 110a. A preset audio pulse signal is output in synchronism with the vehicle speed pulse from the laptop PC 110a and is recorded in audio tracks of the video cameras 122R and 122L. This enables the mapping of each frame of the captured image to the vehicle speed pulse in the imaging position analyzing process. The layout and the connection of the components of the image data acquiring device 100 are not restricted to the illustrated example. The audio input/output connection may be adopted for the video cameras 120a, 120b, and 120c, while the IEEE interface connection may be adopted for the video cameras 122R and 122L.

A pulse generator 104a mounted on the vehicle magnetically detects the rotation of rear wheels of the vehicle and generates a pulse in synchronism with the detected rotation. One available example of the pulse generator 104a is ND-PG1 (trademark) manufactured by Pioneer Corporation. A pulse counter 104b counts the generated pulse and outputs the pulse count with the time. One available example of the pulse counter 104b is TUSB-S01CN1 (trademark) manufactured by Turtle Industry Co., Ltd. In the structure of the embodiment, the pulse generator 104a and the pulse counter 104b are installed in a rear trunk of the vehicle.

The image data acquiring device 100 having the layout and the connection of the illustrated example may be constructed by a combination of commercially available components. These components are portable and carriageable to be detachably attached to the vehicle. The respective components may be carried to a destination for image data acquisition by train or by air and attached to a rental vehicle at the destination. This arrangement advantageously facilitates the image data acquisition at any location.

B. Data Structure

Figure 3:
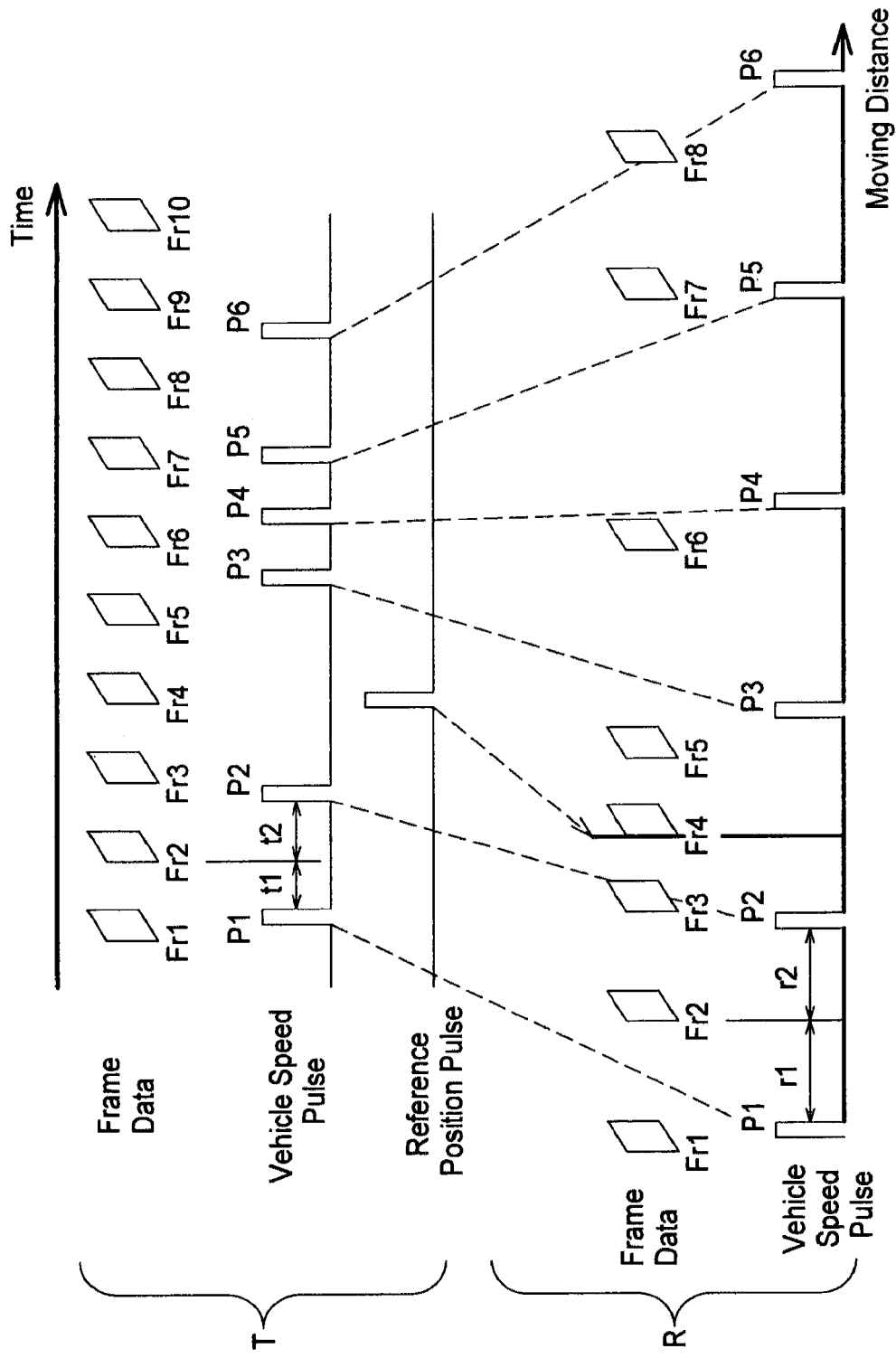
FIG. 3 shows the structure of image data.

FIG. 3 shows the structure of image data. Frame data of a moving image captured by the video camera 120 are shown in relation to vehicle speed pulses and a reference position pulse. In an upper data group T, these data are arranged on the time base.

As shown in the data group T, frame data Fr1 to Fr10 are captured at intervals of every preset time, at intervals of 30 Hz in this embodiment. The frame data may be a set of still images captured at any arbitrary times. In the latter case, the time interval of capturing the frame data may not be fixed but be varied.

Vehicle speed pulses P1 to P6 are output at intervals when the vehicle moves every preset distance, at intervals of about 0.39 m in this embodiment. In the data group T on the time base, the interval of the vehicle speed pulses is varied according to the traveling speed of the vehicle. A narrow interval between the pulses P1 and P2 indicates a relatively high traveling speed. On the contrary, a wide interval between the pulses P2 and P3 indicates a low traveling speed.

The reference position pulse is generated when the vehicle passes through a preset reference position, for example, a pedestrian crossing. The reference position pulse is generated after the travel of the vehicle by some distance and is thus obtained at a lower frequency than those of the frame data and the vehicle speed pulses. The reference position pulse is used as an initial position in the imaging position analyzing process for improvement of the accuracy as described later. The low frequency acquisition of the reference position pulse is sufficient for this purpose.

In a lower data group R, the respective data of the data group T are arranged on the moving distance base. In the data group R on the moving distance base, the vehicle speed pulses P1 to P6 are arranged at equal intervals. The frame data Fr1 to Fr8 are arranged on the assumption of constant speed travel of the vehicle between the respective vehicle speed pulses. For example, the frame data Fr2 is located according to the rule of:

$$t1:t2=r1:r2;$$

where t1 represents a time between the vehicle speed pulse P1 and the frame data Fr2 in the data group T, t2 represents a time between the vehicle speed pulse P2 and the frame Fr2 in the data group T, r1 represents a distance between the vehicle speed pulse P1 and the frame Fr2 in the data group R, and r2 represents a distance between the vehicle speed pulse P2 and the frame Fr2 in the data group R.

The other frame data and the reference position pulse are arranged according to the same rules. This enables arrangement of the respective frame data along the path of imaging as shown in the data group R. Namely each frame data is locatable along the path of imaging.

The arrangement of the frame data is not restricted to these illustrated methods but may be on any of other various bases. For example, when the acquisition frequency of the frame data is sufficiently higher than the acquisition frequency of the vehicle speed pulse, synchronous frame data in synchronism with the vehicle speed pulse may be extracted from all the acquired frame data to be arranged. This gives a group of frame data arranged at the intervals of equal distance. In the case of extraction of the synchronous frame data in synchronism with the vehicle speed pulse, a variation in a predetermined range may be allowed between the acquisition time of the vehicle speed pulse and the acquisition time of the frame data by taking into account the accuracy required for analysis of the imaging position.

C. Principle of Imaging Position Analysis

The principle of the imaging position analysis is described with reference to the group of frame data extracted and arranged at the intervals of equal distance. This principle is also applied to the frame data arranged at the intervals of varying distances like the data group R shown in FIG. 3.

The imaging position analyzing process of the embodiment first sets an initial path, which expresses a traveling path of the vehicle during imaging within a predetermined error range. The initial path is then corrected by a feature point tracking process that is image analysis based on the frame data. This determines the imaging position of each frame data. The initial path setting process and the feature point tracking process are described below in this sequence.

C-1. Initial Path

Figure 4:
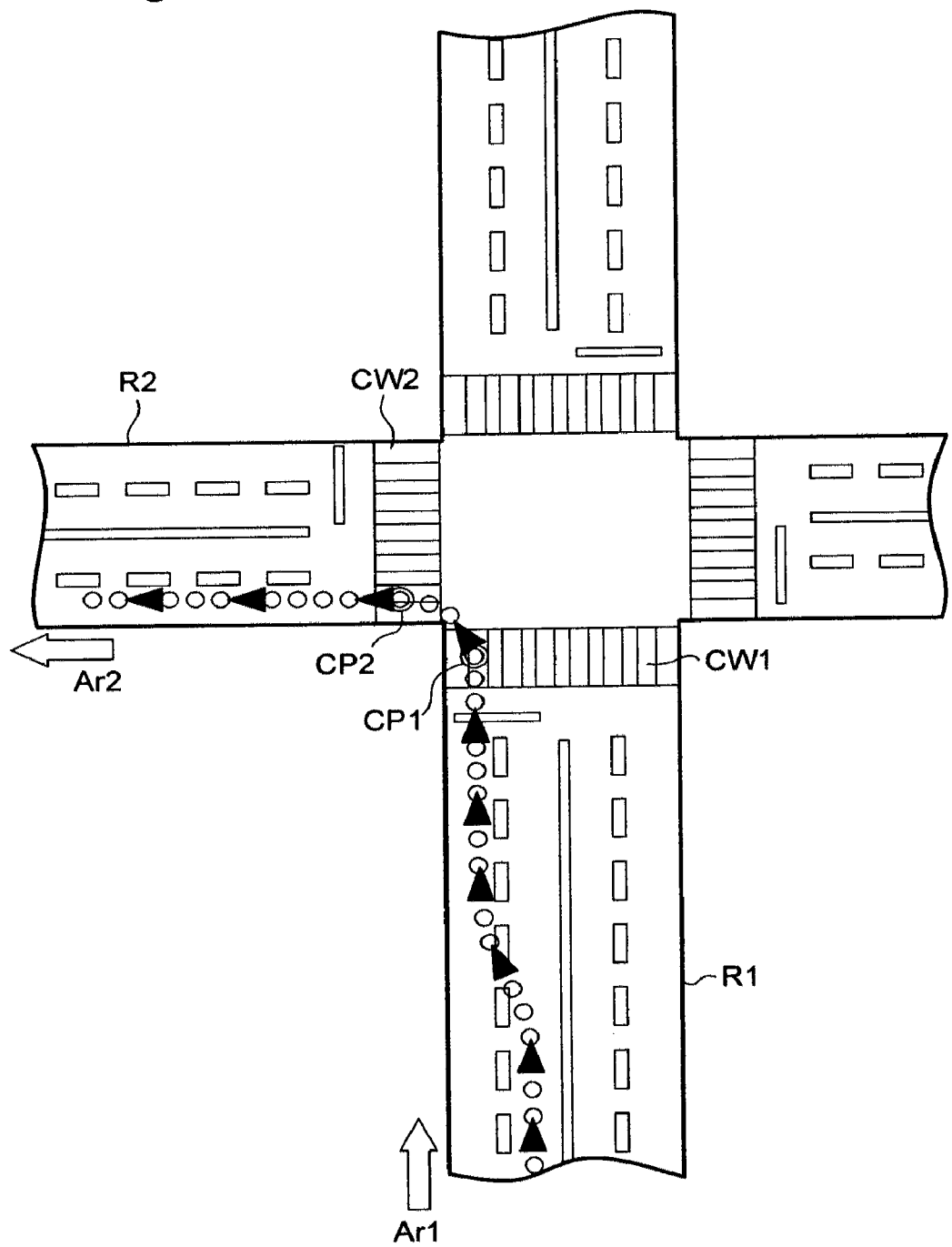
FIG. 4 shows one initial path setting method.

FIG. 4 shows one initial path setting method. This method sets an initial path based on lat/long data obtained by the GPS 102. The traveling path of the vehicle during imaging passes through an intersection of roads R1 and R2 along arrows Ar1 and Ar2. Black triangles represent lat/long data obtained by the GPS 102. The lat/long data of the GPS 102 may be complemented by combined use of a gyroscope. White circles represent a group of frame data acquired at the intervals of equal distance. Double circles CP1 and CP2 represent points of generation of the reference position pulse. In the embodiment, the reference position pulse is generated on pedestrian crossings CW1 and CW2 as mentioned previously.

The initial path is set by sequentially connecting the lat/long coordinates detected by the GPS 102. Frame data are arranged at the intervals of equal distance on the initial path from the points of generation of the reference position pulse as the base. This specifies the imaging position of each frame data as the initial value of the imaging position analyzing process as shown in FIG. 4. Since the lat/long coordinates detected by the GPS 102 include some errors, the initial path set as shown in FIG. 4 includes both an error in the moving direction of the vehicle during imaging (hereafter simply referred to as the 'moving direction') and an error in a direction perpendicular to the moving direction (hereafter simply referred to as the 'perpendicular direction'). This initial path setting method arranges the frame data at the intervals of equal distance from the points of generation of the reference position pulse. The initial path is accordingly expected to include a sufficiently small error in the moving distance. Namely the error included in the initial path is mainly ascribed to the error in the perpendicular direction.

Figure 5:
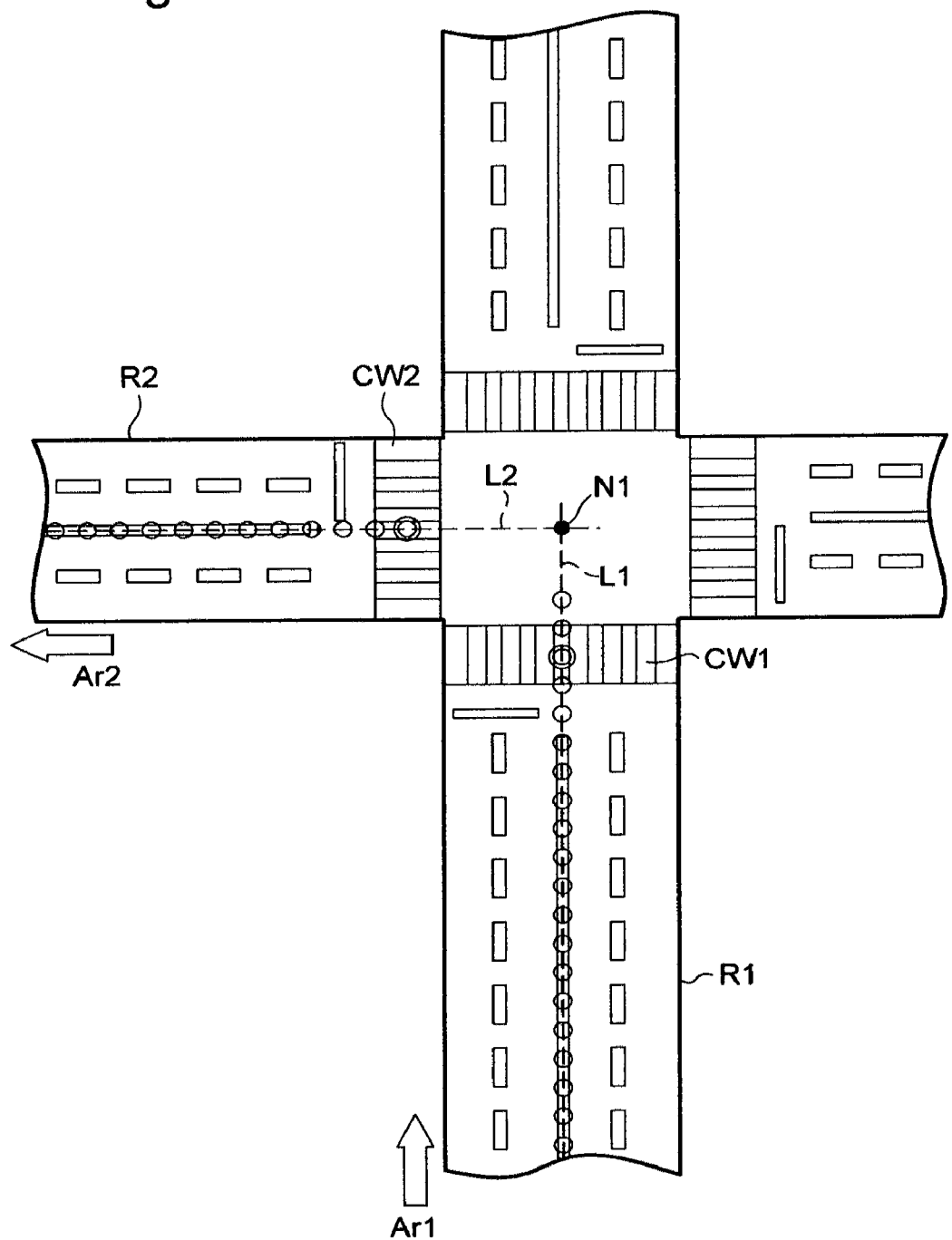
FIG. 5 shows another initial path setting method.

FIG. 5 shows another initial path setting method. This method sets an initial path based on road network data, instead of the lat/long data obtained by the GPS 102. Broken lines L1 and L2 respectively represent links corresponding to roads R1 and R2. A black circle N1 represents a node. The road network data expresses the road by links and nodes. Although all the links are straight in the illustrated example of FIG. 5, the links may be polygonal corresponding to the road configuration. The links are defined by lat/long coordinates of route points and end points. Altitude data, in addition to the lat/long data, may be used for definition of the links.

The initial path is set based on the links of the road where the vehicle passes through during imaging. In the illustrated example, the vehicle during imaging travels along a route going from a road R1 to a road R2. The initial path is accordingly created by links L1 and L2. Frame data are arranged at the intervals of equal distance on the initial path from points corresponding to the reference position pulse as the base. The initial path set by this method may be separated at some point, in the vicinity of a node N1 in the illustrated example. The feature point tracking process described later, however, effectively corrects the initial path to ensure the continuity of the traveling path.

The initial path set by this method also includes some errors relative to the actual imaging positions. Like the initial path set by the former method based on the outputs of the GPS 102 (see FIG. 4), the initial path set by this method is expected to include a relatively small error in the moving distance and mainly have an error in the perpendicular direction.

C-2. Feature Point Tracking Process

Figure 6:
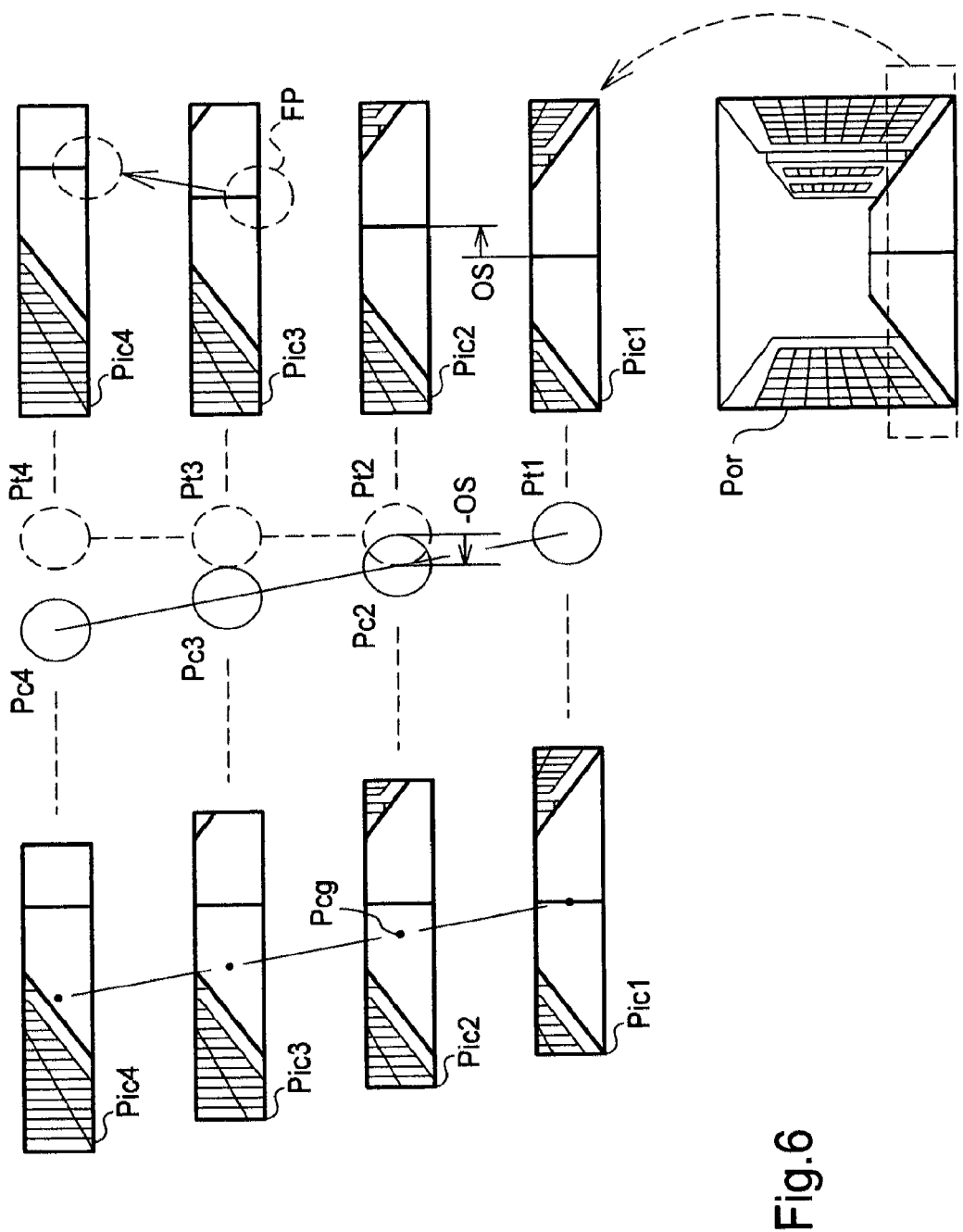
FIG. 6 shows the principle of a feature point tracking process.

FIG. 6 shows the principle of the feature point tracking process. Broken line circles Pt1 to Pt4 shown in the center of FIG. 6 represent the positions of frame data arranged on the initial path. The moving direction of the vehicle is from the circle Pt1 to the circle Pt4. The right side of FIG. 6 shows images Pic1 to Pic4 expressed by frame data at the respective positions. These images are lower image parts cut out from originally captured images. For example, the image Pic1 is a lower image part cut out from an original image Por as shown by the broken line. The other images Pi2 to Pi4 are lower image parts similarly cut out from the respective original images. Hereafter the image part cut out from the original image is referred to as the cutout image.

The feature point tracking process specifies an error of the initial path based on the varying position of a feature point included in these cutout images and corrects the initial path. In this embodiment, a lane marking in vehicle lanes on the road is set to the feature point. In the illustrated example, a solid line shown in the lower center of the original image Por represents the lane marking The images Pic1 to Pic4 are arranged to have the respective centers of figure along the initial path of Pt1 to Pt4. It is here assumed that the feature point is successively shifted as shown by a broken line FP. If the initial path Pt1 to Pt4 accurately represents the actual traveling path of the vehicle during imaging, there is no misalignment of the feature point among the respective images. Namely the misalignment of the feature point proves that the initial path includes some errors. There is a variation OS between the images Pic1 and Pic2. The variation OS represents an error of the position Pt2 in the perpendicular direction relative to the position Pt1 on the initial path as the base. Namely a shift of the position Pt2 by '−OS' in the perpendicular direction gives a position on an accurate traveling path. This position on the accurate traveling path is expressed by a solid line circle Pc2.

A variation of the feature point between adjacent images is specified in the above manner with regard to the other positions Pt3 and Pt4. The positions Pt3 and Pt4 are corrected in the perpendicular direction according to the specified variations of the feature point to give positions Pc3 and Pc4 on the accurate traveling path. In the illustrated example, such correction gives an actual traveling path passing through the original position Pt1 and the corrected positions Pc2 to Pc4 as shown by a solid line. The left side of FIG. 6 shows the images Pic1 to Pic4 arranged to have the respective centers of figure along the accurate traveling path of the solid line. This drawing clearly shows cancellation of the misalignment of the feature point among the images.

In the illustrated example of FIG. 6, the cutout images simply cut out from the respective original images are used for the feature point tracking process. Prior to the feature point tracking process, a distortion existing in the lower image part may be corrected by affine transform. Such correction is especially preferable for image data taken with a wide-angle camera. The correction gives corrected images that are equivalent to overhead images of the road surface. The feature point tracking process thus desirably enhances the accuracy of the imaging position analysis.

The lower image parts cut out from the original images are used as the cutout images for the feature point tracking process in this embodiment. The feature point is not restricted to the indication on the road, for example, the lane marking, but may be any arbitrary point having a positional misalignment among the images, which reflects an error included in the initial path. Part of a continuum captured in multiple frames, for example, an indicator on the road, a guardrail or a construction along the road, may be used as the feature point. The cutout images used for the feature point tracking process are not restricted to the lower image parts of the original images but may be any image parts of the original images including the feature point. The overall original images, instead of the cutout images, may be used for the feature point tracking process. The feature point in the lower image part generally includes the position closest to the camera in the captured image. The use of the lower image parts as the cutout images for the feature point tracking process thus desirably enhances the accuracy of the imaging position analysis.

As mentioned above, the feature point tracking process may adopt the affine transform to correct the distortion existing in the image. A procedure of setting conversion factors for the distortion correction is described below.

Figure 7:
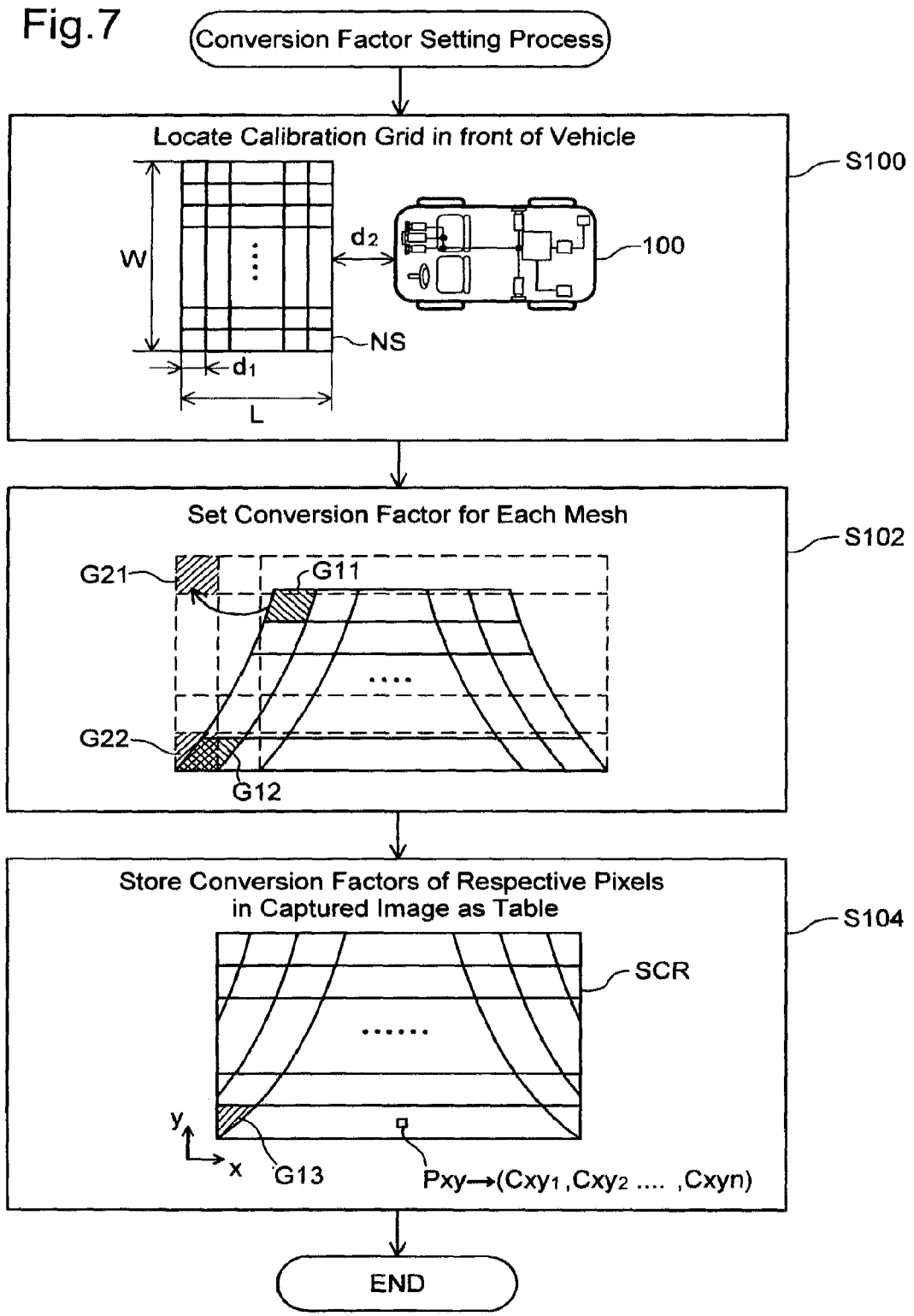
FIG. 7 is a process chart showing a conversion factor setting process.

FIG. 7 is a process chart showing a conversion factor setting process. A calibration grid is located on the road surface in front of the vehicle equipped with the image data acquiring device 100 (step S100). It is desirable to locate the grid on the flat, even road surface without any significant slope or irregularities. The grid is located in front of the vehicle across a distance d2, which allows capture of an end line NS on the vehicle's side. The grid may have an arbitrary width W and an arbitrary length L. In order to set the conversion factors with sufficiently high accuracy, the preferable dimensions of the grid cover the shooting range of the camera. In this embodiment, the grid has the width W of 15 m and the length L of 3.5 m. The grid has an arbitrary mesh size d1. The smaller mesh size desirably improves the conversion accuracy but undesirably increases the required memory capacity for storage of the conversion factors. In this embodiment, the grid has the mesh size d1 of 50 cm.

The conversion factor is set for each mesh of the grid (step S102). The captured image of the grid located ahead of the vehicle has a substantially trapezoidal distortion as shown by the solid line. The conversion factor is set for each mesh of the grid to convert the respective distorted meshes to their original shape shown by the broken line, that is, the front captured image of the grid. For example, a conversion factor for a mesh G11 is set to convert the mesh G11 to a mesh G21, and a conversion factor for a mesh G12 is set to convert the mesh G12 to a mesh G22. The conversion factor for the mesh G11 may be identical with or different from the conversion factor for the mesh G12.

The conversion factors set for the respective meshes of the grid are stored as a table (step S104) and are used for the distortion correction in the feature point tracking process. In an illustrated example of the table, conversion factors Cxy1, Cxy2, . . . , Cxyn are stored for each pixel Pxy of a captured image SCR. A conversion factor set for a mesh G13 at step S102 is assigned to a pixel representing the mesh G13 in the captured image SCR of the grid. Such setting enables the accurate distortion correction in each of the pixels of the captured image in the feature point tracking process. This method is, however, not restrictive but any other suitable method may be adopted to set the conversion factors. For example, a fixed conversion factor may be used for the whole image plane of the captured image or for meshes aligned in an x-axis direction.

Figure 8:
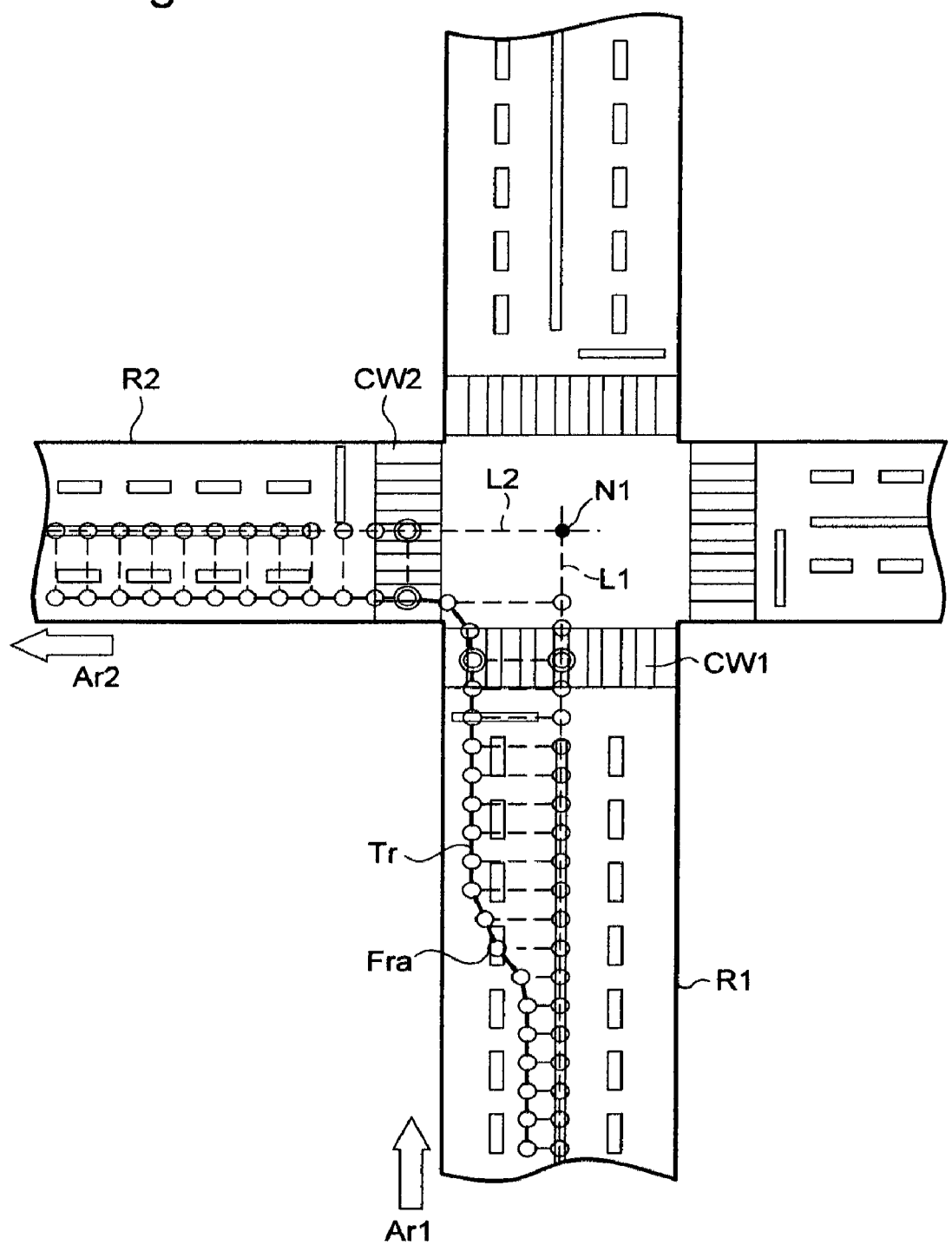
FIG. 8 shows one example of the feature point tracking process.

FIG. 8 shows one example of the feature point tracking process. This shows the correction result of the initial path set in the example of FIG. 5 by the feature point tracking process. The feature point tracking process corrects the positional errors in the perpendicular direction of the frame data (shown by the open circles) arranged along the initial path. Such correction gives a traveling path Tr shown by the thick line. While the initial path is separated in the vicinity of the node N1, the correction of the positional errors in the perpendicular direction ensures the continuity of the traveling path Tr.

In the illustrated example of FIG. 8, the reference position itself (shown by the double circles) is corrected in the perpendicular direction. The reference position is a point of known lat/long coordinates. In the method of setting the initial path based on the road network data, the reference position itself is tentatively located on the road network data and accordingly requires the correction. The feature point tracking process is performed after the shift of the reference position to a position of known lat/long coordinates to give the illustrated traveling path.

In this embodiment, the reference position is the point of the known lat/long coordinates. The feature point tracking process is applicable to a reference point having an unknown latitude or longitude. The unknown latitude or longitude leads to failed identification of the reference position in the perpendicular direction. In such cases, the imaging position in the perpendicular direction is specified from the absolute coordinates of a feature point at the reference position in the captured image. For example, when a point on the center of the width of the road in the captured image matches with a middle point in the lower part of the image, the imaging position is identified as the center of the road. When a dividing point internally dividing the road width at a preset rate matches with the middle point in the lower part of the image, the imaging position is identified as the position of internally dividing the road at the same rate.

In the description above, one single reference position is used as the base in both the moving direction and the perpendicular direction. The feature point tracking process may use different reference positions in the moving direction and in the perpendicular direction. As shown in FIG. 8, the reference position in the perpendicular direction may be a point Fra where the traveling path Tr crosses over the lane marking, while the reference position in the moving direction is the point on the pedestrian crossing. At the point Fra, the lane marking is located in the substantial center of the captured image. Any of various methods may be adopted to select reference positions and utilize the coordinates of the selected reference positions in the feature point tracing process. The feature point tracking process may adopt one single method or may selectively use multiple methods according to various conditions.

D. Imaging Position Analyzing Process

Figure 9:
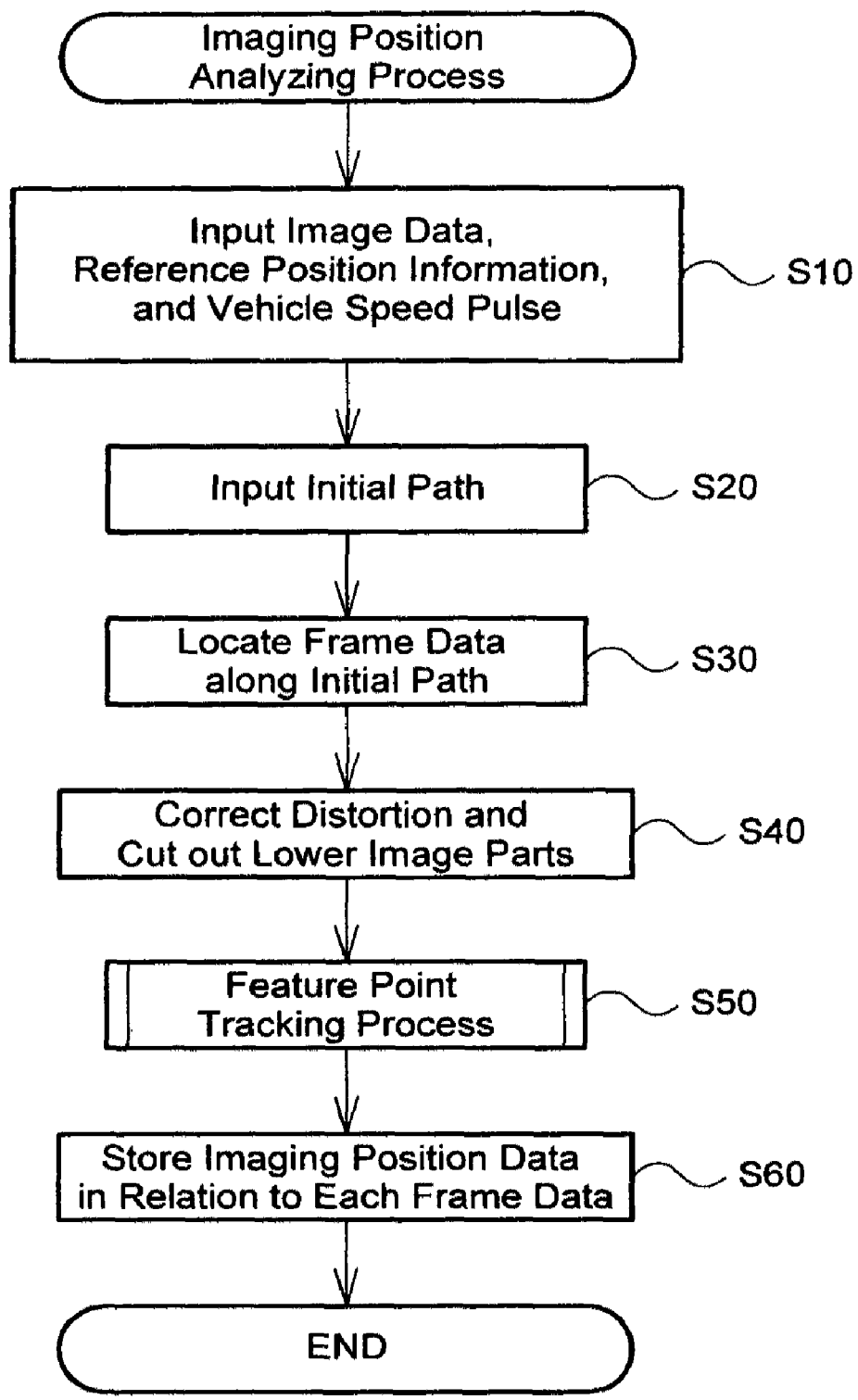
FIG. 9 is a flowchart showing an imaging position analyzing process.

FIG. 9 is a flowchart showing an imaging position analyzing process. The imaging position analysis is performed by the combined operations of the respective functional blocks of the image data processing device 200 (see FIG. 1). In the hardware configuration, the CPU of the computer constructed as the image data processing device 200 executes this imaging position analyzing process.

In the imaging position analyzing process, the CPU first inputs image data, reference position information, and vehicle speed pulses (step S10). As explained previously with reference to FIG. 1, these input data are generated by the image data acquiring device 100 and are input into the image data processing device 200 via the removable hard disk 114a.

The CPU then inputs an initial path (step S20). In the arrangement of the embodiment, in response to the user's selection, either the initial path set based on the lat/long coordinates detected by the GPS 102 (see FIG. 4) or the initial path set based on the road network data (see FIG. 5) is input at step S20. The initial path input here may be fixed to one of these initial paths. In the case of the initial path based on the road network data, the imaging position analyzing process may receive the user's specification of nodes and links and generate an initial path according to the specification.

After the input of the initial path, the CPU arranges the frame data on the initial path (step S30). This corresponds to the processing explained above with reference to FIG. 3. The input frame data are located along the initial path in response to the vehicle speed pulses. Synchronous frame data in synchronism with the vehicle speed pulses may be extracted from the input frame data and arranged at the intervals of equal distance along the initial path.

The CPU performs the distortion correction of the arranged frame data by the affine transform and cuts out the lower image sections of the respective frames as cutout images (step S40) and performs the feature point tracking process (step S50). The data on the identified imaging positions of the respective frames are stored in correlation to the frame data (step S60). This corresponds to the processing explained above with reference to FIG. 6.

Figure 10:
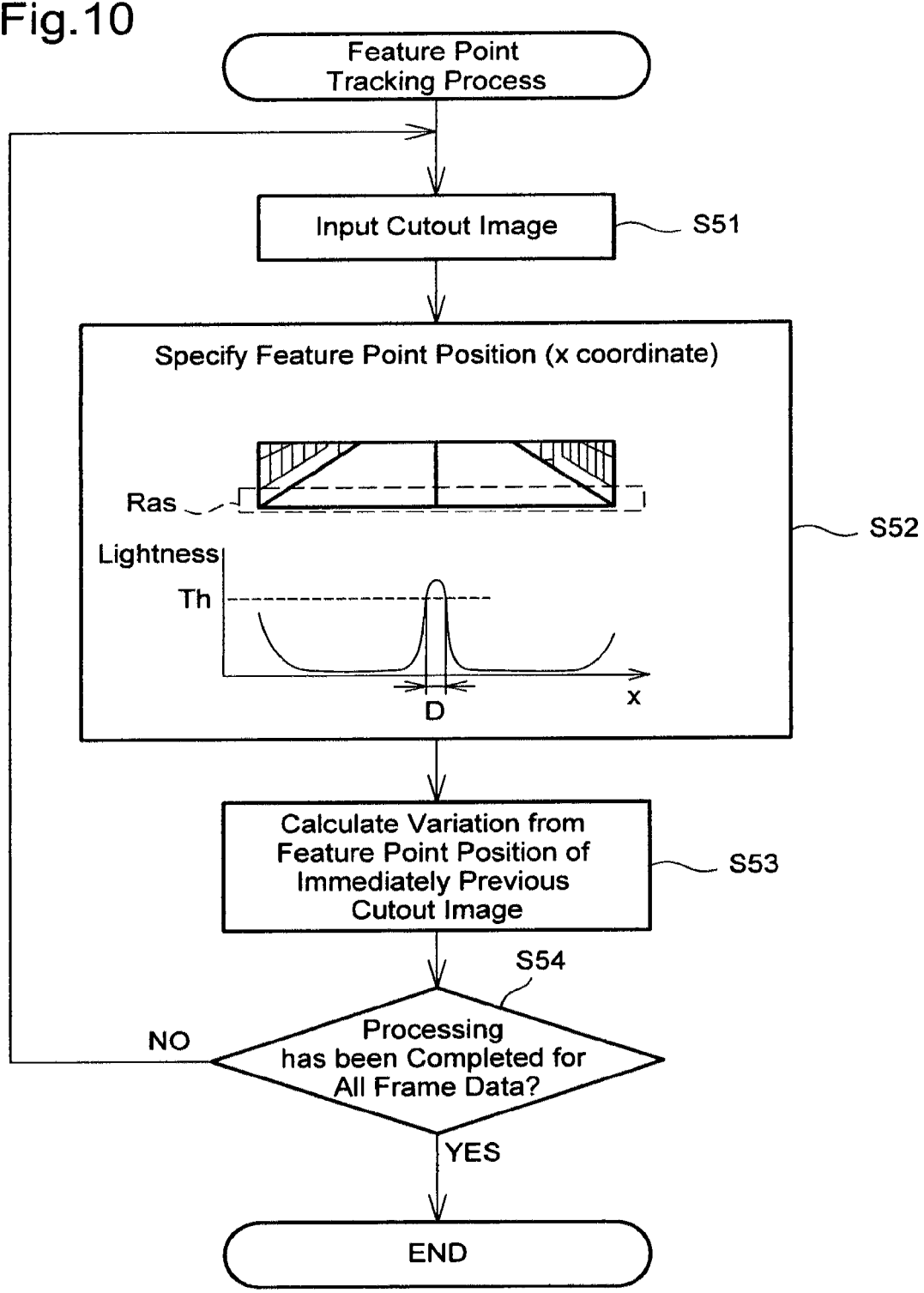
FIG. 10 is a flowchart showing the details of the feature point tracking process executed in the imaging position analyzing process.

FIG. 10 is a flowchart showing the details of the feature point tracking process executed at step S50 in the imaging position analyzing process of FIG. 9. In the feature point tracking process, the CPU inputs a cutout image as a processing object (step S51) and specifies a feature point position (step S52). The feature point position is expressed by a coordinate in an x-axis direction, which is the perpendicular direction perpendicular to the moving direction of the vehicle.

In the illustrated example, the feature point position is specified by analyzing a preset lower area Ras in the cutout image. The lane marking on the road surface, which is often set to the feature point, is generally drawn by the white line and has the higher lightness than the residual part of the road surface. The lower area Ras accordingly has a lightness distribution in the x-axis direction as illustrated. The procedure of specifying the feature point position extracts a specific range D exceeding a preset threshold value Th from the lightness distribution and sets the middle point of the extracted range D to the feature point position. The threshold value Th is set in a recognizable range of white lines.

After specification of the feature point position, the CPU calculates a variation from the feature point position in an immediately previous cutout image (step S53). The immediately previous cutout image is cut out from frame data located immediately before the frame data of the processing object among multiple frame data arranged in time series along the initial path. In the case of extraction of the synchronous data in synchronism with the vehicle speed pulses from the acquired frame data, the immediately previous frame data in the arrangement of the extracted frame data may be different from the immediately previous frame data along the time series.

The above series of processing is repeated by the CPU to complete the feature point tracking process with regard to all the input frame data (step S54).

The above procedure is only illustrative and is not restrictive in any sense. For example, the feature point position is not restricted to the lane marking drawn by the white line but may be an edge of a construction. The feature point position is specified according to the lightness distribution in the above example but may be specified by taking into account the hue and the saturation in addition to the lightness. Another available procedure extracts an edge from the input cutout image by image processing and selects a line segment regarded as a lane marking to specify the feature point position.

The procedure of FIG. 10 calculates the variation of the feature point position based on the lower areas Ras of the object cutout image and the immediately previous cutout image. One modified procedure may refer to the feature point position in an upper area of the immediately previous cutout image to calculate the variation of the feature point position. Namely the calculated variation is between the feature point position in the upper area of the immediately previous cutout image and the feature point position in the lower area of the object cutout image. This modified method advantageously enables alignment of two cutout images with higher accuracy.

Figure 11:
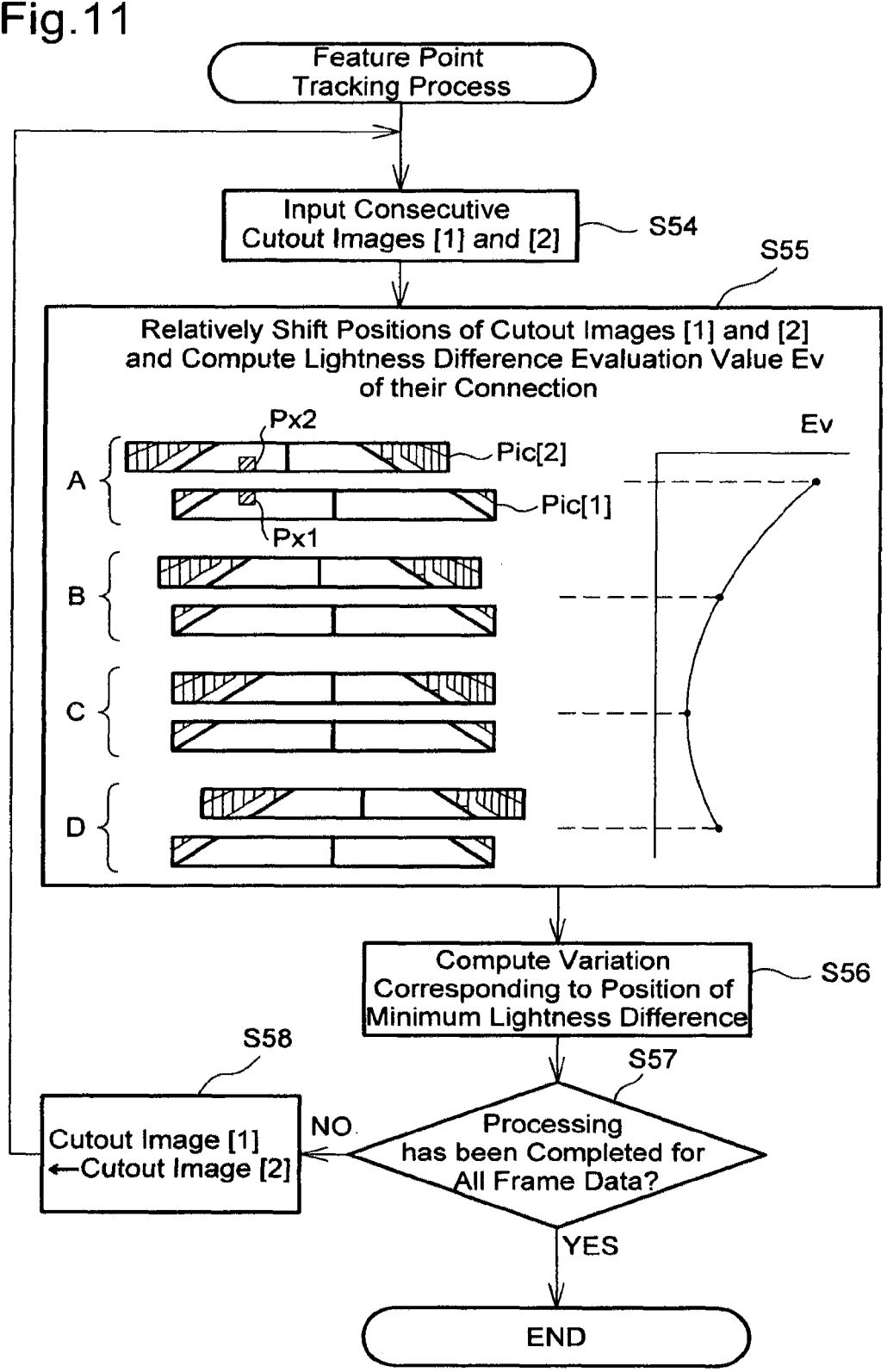
FIG. 11 is a flowchart showing a modified flow of the feature point tracking process.

FIG. 11 is a flowchart showing a modified flow of the feature point tracking process. In the modified flow of the feature point tracking process, the CPU first inputs two consecutively arranged cutout images [1] and [2] (step S54). The CPU relatively shifts the positions of the cutout images [1] and [2] and computes a lightness difference evaluation value Ev of the connection between the two consecutive cutout images [1] and [2] (step S55).

A procedure of computing the lightness difference evaluation value Ev with regard to two cutout images Pic[1] and Pic[2] is shown in the box of step S55. The position of the cutout image Pic[2] is shifted rightward in the perpendicular direction relative to the position of the cutout image Pic[1] according to phases A to D. The procedure calculates the absolute value or the square of a lightness difference between pixels Px1 and Px2 having an identical coordinate in the x-axis direction in a connection of the cutout images Pic[1] and Pic[2] in the phase A and sets the summation of the absolute values or the squares of the lightness differences in the x-axis direction to the lightness difference evaluation value Ev.

The lightness difference evaluation value Ev is varied according to the relative positions of the cutout images Pic[1] and Pic[2]. A variation in lightness difference evaluation value Ev is shown in the right half of the box of step S55. The lightness difference evaluation value Ev reaches its minimum in the phase C where the two cutout images Pic[1] and Pic[2] are perfectly aligned. The variation between the two cutout images Pic[1] and Pic[2] is thus determinable by specifying the positional relation of the cutout images Pic[1] and Pic[2] having the minimum lightness difference evaluation value Ev (step S56).

The above series of processing is repeated with replacement of the current cutout image [2] to a next cutout image [1] (step S58) to complete the feature point tracking process with regard to all the frame data (step S57). This modified flow of the feature point tracking process computes the variation based on the lightness difference between adjacent cutout images and thus advantageously enables alignment of images with high accuracy.

E. Sign/Indication Extraction Process

Figure 12:
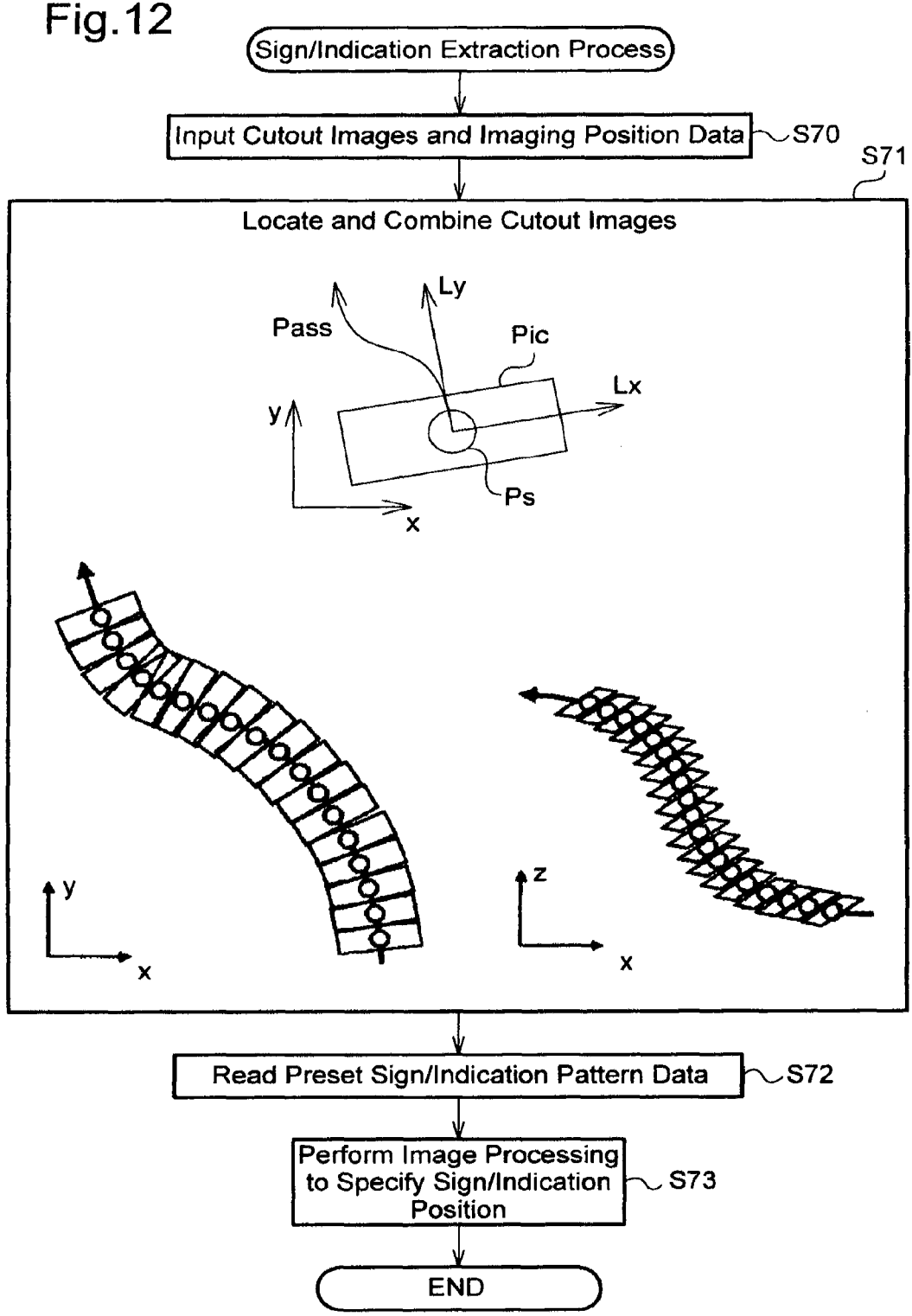
FIG. 12 is a flowchart showing a sign/indication extraction process.

FIG. 12 is a flowchart showing a sign/indication extraction process. The sign/indication extraction process utilizes imaging position data obtained by the imaging position analyzing process described above with reference to FIGS. 9 and 10. The sign/indication extraction process is equivalent to the processing executed by the sign/indication extractor 214 shown in FIG. 1. In the hardware configuration, the CPU of the computer constructed as the image data processing device 200 executes this sign/indication extraction process.

In the sign/indication extraction process, the CPU inputs cutout images and imaging position data (step S70). The cutout image has been processed by affine transform and is equivalent to an overhead image of the road surface.

The CPU locates and combines the cutout images according to the imaging position data to obtain a composite image (step S71). The cutout images are successively arranged on a plane as shown in the upper half of the box of step S71. As the result of the imaging position analyzing process, the imaging position of each cutout image Pic is specified by a combination of x and y coordinates, and the traveling path of the vehicle is given as a curve Pass. Ps represents the center of figure in the cutout image Pic. Lx and Ly are coordinate axes in the perpendicular direction and in the moving direction. The cutout image Pic is arranged to locate the center of figire Ps at the specified imaging position and to set the coordinate axis Ly as a tangent of the traveling path Pass.

One example of sequentially arranging the cutout images by the above procedure is shown in the lower half of the box of step S71. The left side drawing shows two-dimensional arrangement of cutout images on an x-y plane. The cutout images are successively arranged with gradually changing their directions along the traveling path of the vehicle. This gives a flat composite image like an aerial photo image. The composite image is obtained from the images captured in the vicinity of the road surface and accordingly has the resolution of several times as high as the resolution of the aerial photo image.

In the right side drawing, the cutout images are successively arranged along the traveling path with a variation in height (z-axis direction). This traveling path is obtained, for example, by application of the feature point tracking process (see FIGS. 9 and 10) to the initial path set based on the altitude information of the road network data. The use of the altitude information gives a composite image even for an upslope to the highway lamp. The images are captured by the vehicle traveling on the road. A flat composite image is thus generable even for road under an elevating structure, which is unobtainable in aerial photography.

The CPU reads sign/indication pattern data prepared in advance (step S72), and performs image processing of the composite image to find a specific image part matching with the sign/indication pattern data and identify the position of a sign/indication (step S73). The appearance of the sign/indication may additionally be identified. The sign/indication pattern data includes indications drawn on the road surface, for example, a right turn lane and a left turn lane, traffic lights, and road signs. The CPU performs the image processing to extract a shape corresponding to a sign/indication in the sign/indication pattern data from the composite image and identify the location of the extracted corresponding shape. When a shape included in the composite image does not perfectly match with a corresponding indication or road sign included in the pattern data, the pattern data may be expanded or contracted at any arbitrary ratio in the lateral direction or in the vertical direction to identify the appearance of the indication or the road sign.

F. Concrete Examples

Figure 13:
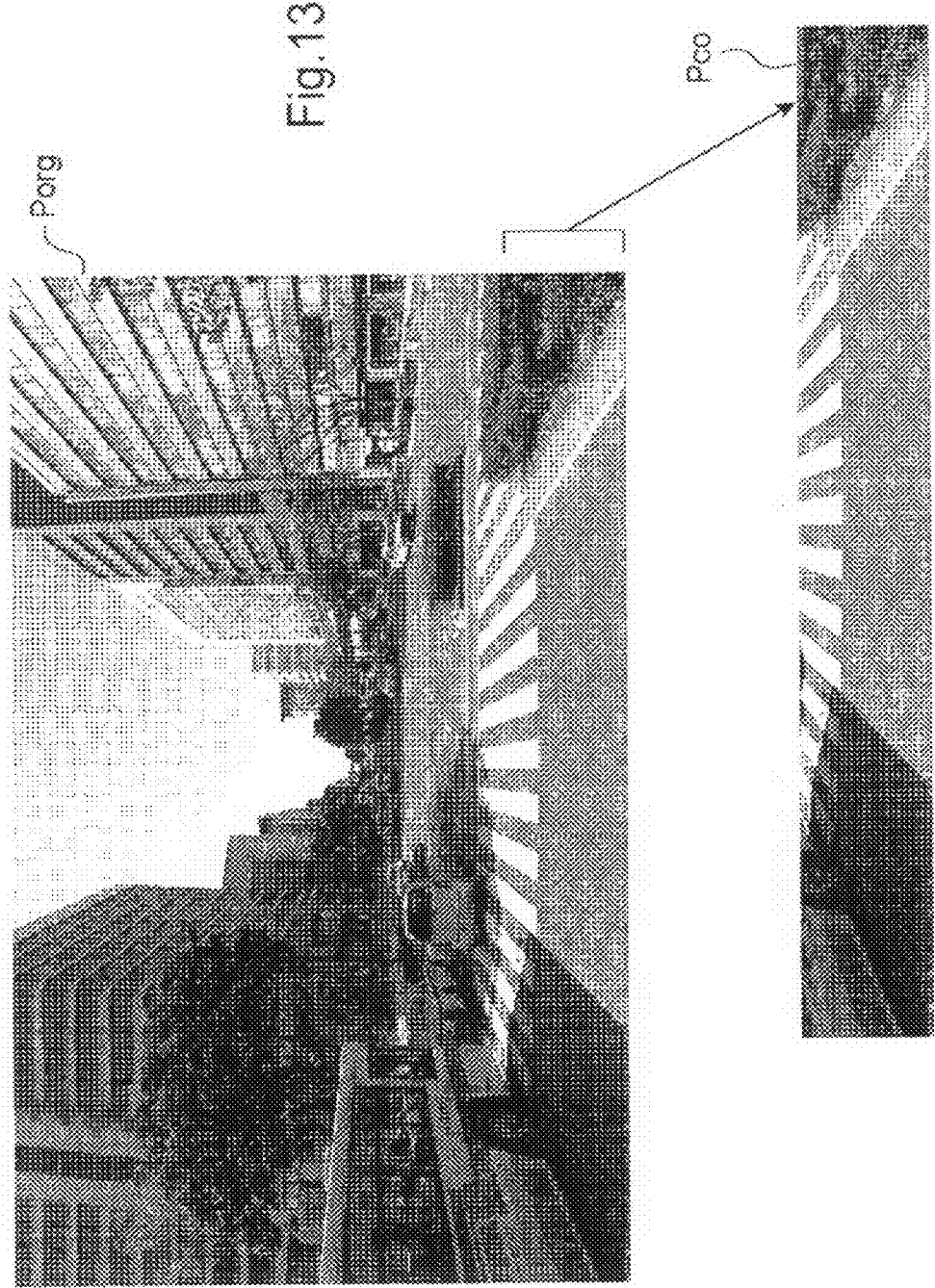
FIG. 13 shows one concrete example of image data processing.
Figure 14:
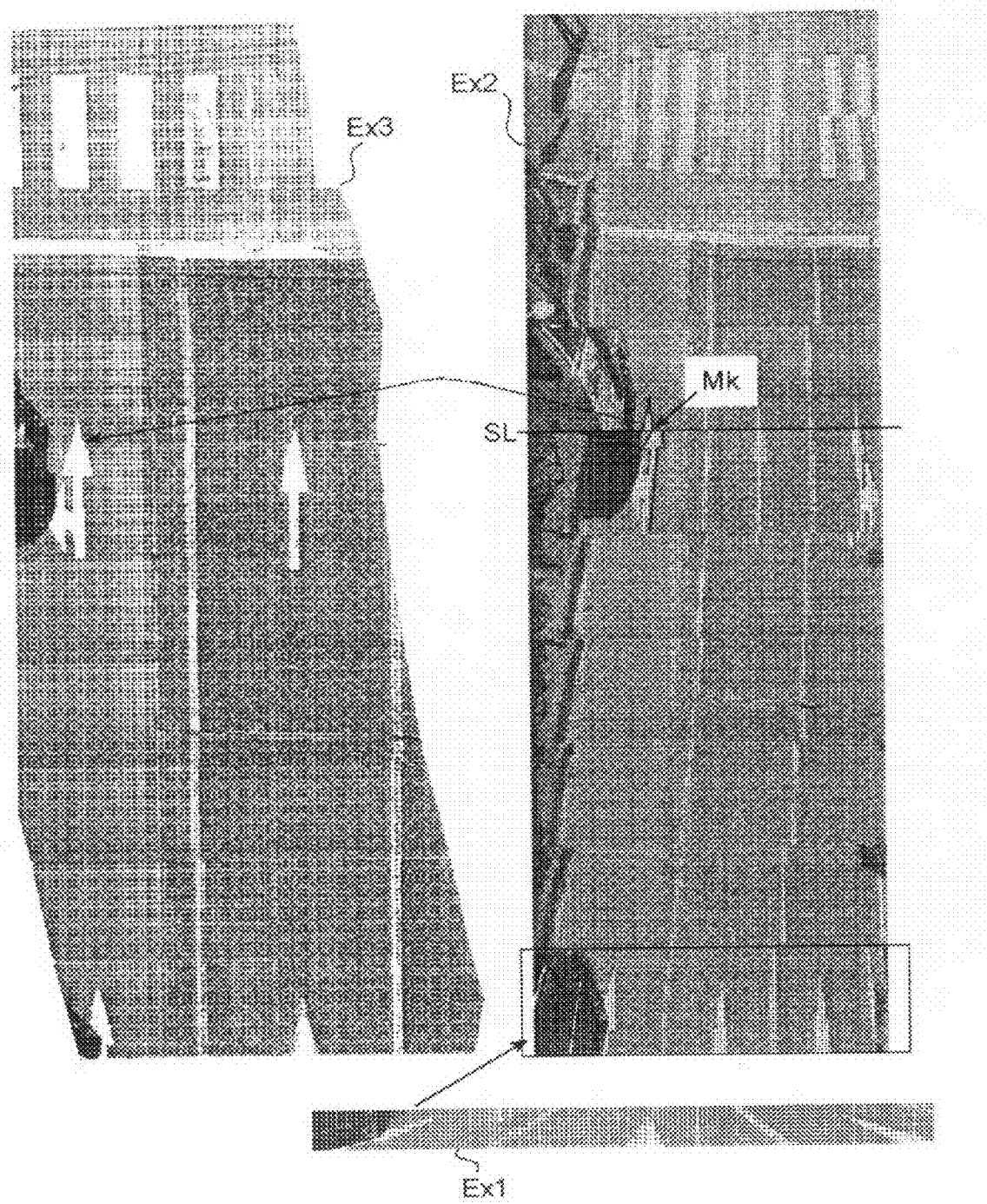
FIG. 14 shows another concrete example of image data processing.

FIGS. 13 and 14 show concrete examples of image data processing. An image Porg shown in FIG. 13 is a captured image ahead of the vehicle taken with a video camera. A lower image part is cut out from the original image Porg as a cutout image Pco. The cutout image Pco is before the affine transform.

An image Ex1 shown in the bottom of FIG. 14 is one example of a cutout image. The affine transform of the cutout image Ex1 gives a rectangle-framed image in the bottom of an image Ex2. Consecutive cutout images provided for the other frame data are subjected to affine transform and are arranged along the initial path to give the image Ex2. Namely the image Ex2 is equivalent to an image after the processing of step S30 in the imaging position analyzing process (FIG. 9). This image Ex2 is shown only for the convenience of explanation. The actual process does not require generation of such a composite image by arranging and combining respective frame data.

The image Ex2 is obtained without correcting a positional misalignment in the direction perpendicular to the moving direction. There is accordingly a misaligned part with a discontinuous indication on the road surface. For example, a road indication Mk showing a straight and left turn lane is misaligned in the lateral direction on a boundary SL of the frame data. The indication Mk is outlined for the easy recognition.

An image Ex3 is obtained by correcting the positional misalignment in the perpendicular direction by the feature point tracking process. This is a composite image obtained after identification of the imaging position of each frame data and is equivalent to an image after the processing of step S71 in the sign/indication extraction process (FIG. 12). The positional misalignment of the road indication is eliminated in the image Ex3. The position of the road indication showing the straight and left turn lane or the position of a pedestrian crossing is identifiable based on this composite image. In the illustrated example, part of the road indication showing the straight and left turn lane is missing by the presence of a vehicle. The appearance of the road indication is, however, reproducible with reference to the pattern data.

As described above, the image data processing system of the embodiment performs the feature point tracking process and enables the highly accurate identification of the imaging position in the direction perpendicular to the moving direction. The use of vehicle speed pulses or equivalent information representing the moving distance during imaging desirably enhances the positioning accuracy in the moving direction. This enables identification of the imaging position of each frame data with high accuracy and gives a high-resolution composite image as shown in FIG. 14.

The use of this composite image enables identification of the appearance and the position of each road indication drawn on the road surface or each road sign on the road without any special measurement but by simply taking images with a video camera mounted on the vehicle traveling on the road. This procedure significantly reduces the load for generation of three-dimensional map data that accurately reproduces the road profile. Generation of the three-dimensional map data is only one possible application after identification of the imaging position of each frame data. The frame data with the identified imaging position may be adopted in diversity of other applications, for example, estimation of the height of each building construction.

G1. Modified Example

Arrangement of Frame Data

Figure 15:
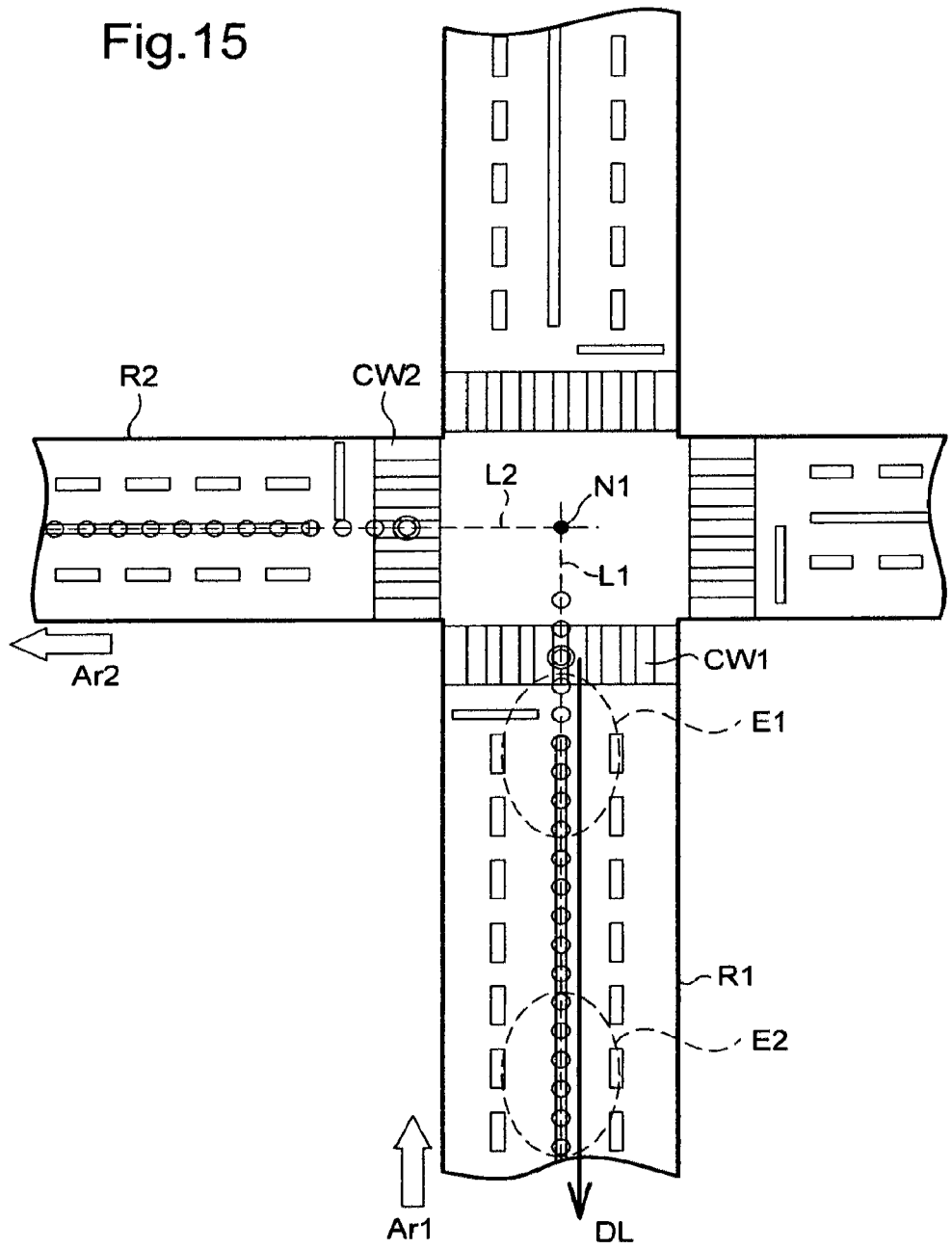
FIG. 15 shows a procedure of frame data arrangement in one modified example.

FIG. 15 shows a procedure of frame data arrangement in one modified example. This is equivalent to modification of step S30 in the imaging position analyzing process (FIG. 9). Like the example described in the above embodiment, frame data captured by the vehicle traveling from an arrow Ar1 to an arrow Ar2 are arranged on a traveling path defined by links L1 and L2 in this illustrated example.

In this modified example, frame data are arranged in reverse to the time series during imaging from a reference position (shown by the double circle) as a starting point. For example, frame data are sequentially arranged on the link L1 from the reference position as the starting point at every backward position reversely moved by a distance corresponding to the vehicle speed pulse, that is, at every position moved in the direction of an arrow DL. An area E1 closer to the reference position has the higher positioning accuracy of the frame data than a relatively farther area E2 on the link L1. The imaging position analysis, the image composition, and the sign/indication extraction based on this arrangement ensures the higher accuracy of the composite image and the higher positioning accuracy of each extracted sign/indication in the area closer to the reference position. The generated data are usable, for example, for a guide image of a navigation system mounted on the vehicle. When the vehicle travels from the arrow Ar1 to the arrow Ar2 in the illustrated example of FIG. 15, the vehicle is guided with the higher accuracy and the enhanced smoothness at the location closer to an intersection corresponding to a node N1. This further enables auto drive control of the vehicle.

As a further modification of this example, frame data may be sequentially arranged in both the moving direction and the reverse direction from the reference position as the starting point. This modification combines the arrangement described in the embodiment (FIG. 5) with the arrangement of the above modified example (FIG. 15) and desirably enhances the positioning accuracy of the whole frame data.

In the processing of a captured image of the road having multiple opposed lanes, the sequential arrangement of frame data in reverse to the time series from the reference position as the starting point is suitable for a captured image of a lane on only one single side (generally the lane where the vehicle travels during imaging). The sequential arrangement of frame data in both the moving direction and the reverse direction from the reference position as the starting point is suitable for a captured image of lanes on both the sides.

G2. Modified Example

Utilization of Side Image

In the embodiment described above, the pedestrian crossing is used as the reference position (see FIG. 6). For the enhanced accuracy of analysis, the combined use of diverse reference positions is desirable. Even when the indication of the pedestrian crossing is faded away to be unusable as the reference position or is hidden away by another vehicle or obstacle to be not captured, the other reference position is usable for the imaging position analysis. In one modified example, a building construction included in a captured image by the side video camera 122R or 122L (see FIG. 2) is used as the other reference position.

Figure 16:
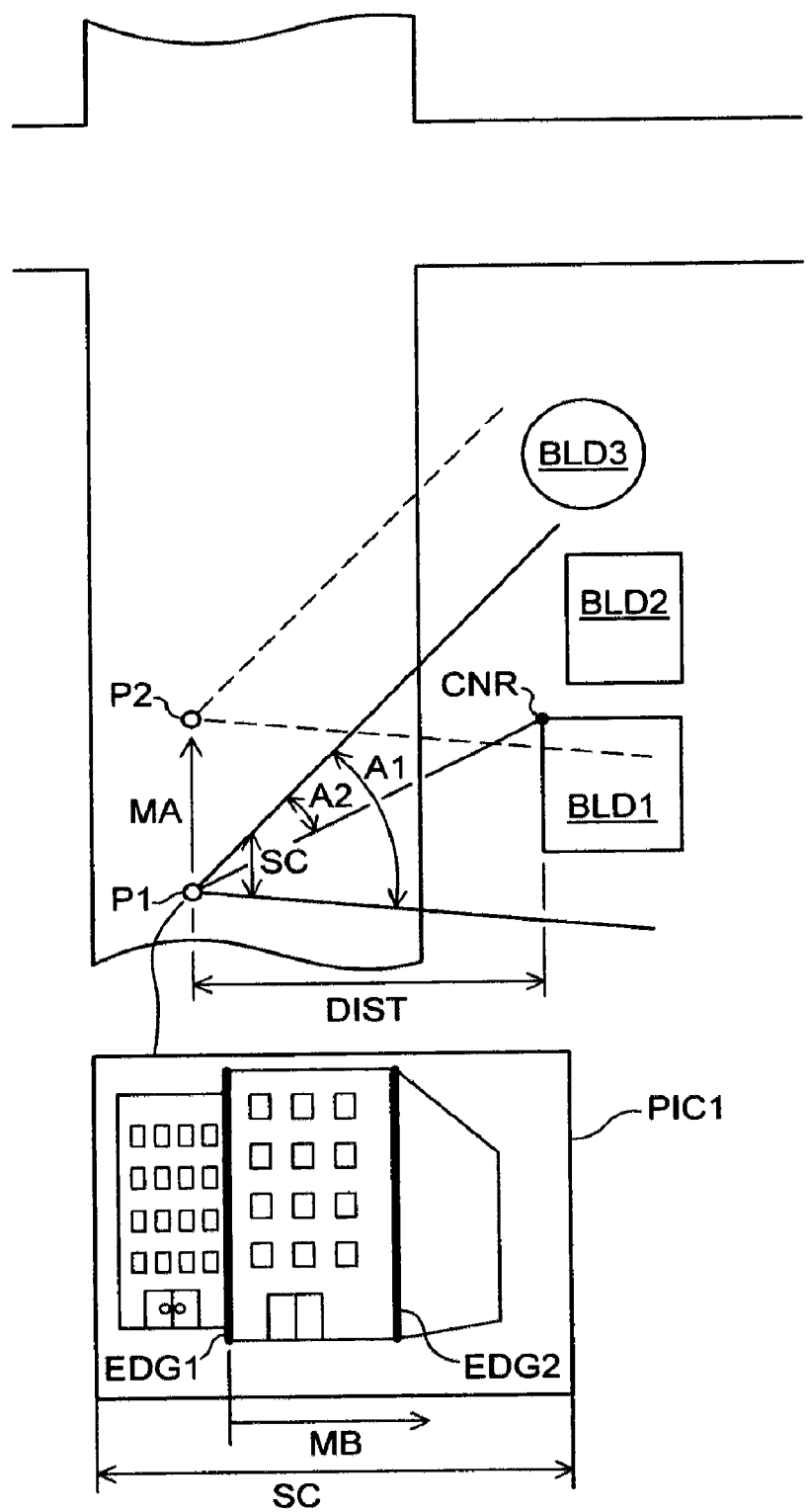
FIG. 16 shows a method of determining a reference position based on a side image in another modified example.

FIG. 16 shows a method of determining a reference position based on a side image in this modified example. The upper drawing shows part of a two-dimensional map. The side image is captured by the vehicle traveling from a point P1 to a point P2 on the road. There are building constructions BLD1 to BLD3 along the road. The position coordinates (lat/long coordinates) are known for these building constructions BLD1 to BLD3.

The building constructions are shot at the point P1 with an angle of view A1 shown by the solid line. As shown in the lower drawing, the building constructions BLD1 and BLD2 are included in a captured image PIC1 at the point P1. The building constructions are shot again the point P2 with an angle of view shown by the broken line. As comparison between the images taken at the point P1 and at the point P2, the position of a corner CNR of the building construction BLD1 is shifted relatively. An angle A2 is between a line connecting the point P1 with the corner CNR and one sideline of the view angle. At the point P1, an edge EDG1 corresponding to the corner CNR is taken as a point of internally dividing a width SC of the image plane PIC1 at a ratio of A2/A1. At the point P2, the angle A2 is increased to move the position of the edge EDG1 rightward. MB represents this moving distance of the edge EDG1. There is a known distance MA from the point P1 to the point P2. A distance DIST from the imaging position to the corner CNR is geometrically determinable, based on the moving distances MA and MB and the angle of view A1. Another edge EDG2 of the building construction BLD1 is similarly processed. The determination of the distance DIST enables specification of the actual distance between the two edges EDG1 and EDG2, that is, the width of the building construction BLD1, based on the angle of view A1.

The above description regards the case of capturing the image of the building construction BLD1. This procedure is also applicable to the case of capturing the image of a non-identified building construction. In the modified example, the image data processing device 200 searches for the building included in the captured image PIC1, based on the above computation result. The positions of the points P1 and P2 are specified within a predetermined error range. In this modified embodiment, the position coordinates of the building construction at the distance DIST from the point P1 are thus computable within the predetermined error range. With reference to a map database, a building construction having the width computed from the edges EDG1 and EDG2 in the captured image PIC1 is identifiable at the position close to the computed position coordinates. The actual position coordinates of the identified building construction are then determined according to the map database. A difference between the actual position coordinates of the building construction in the map database and the computed position coordinates represents a positional error of the point P1. The position coordinates of the point P1 are correctable by reflection of this difference. The imaging position corrected in this manner is usable as the reference position.

The edges EDG1 and EDG2 of the building construction may automatically be specified by image processing. In the method of this modified example, however, for the enhanced accuracy, the operator manually specifies the edges EDG1 and EDG2 in the image with a mouse or another pointing device.

Figure 17:
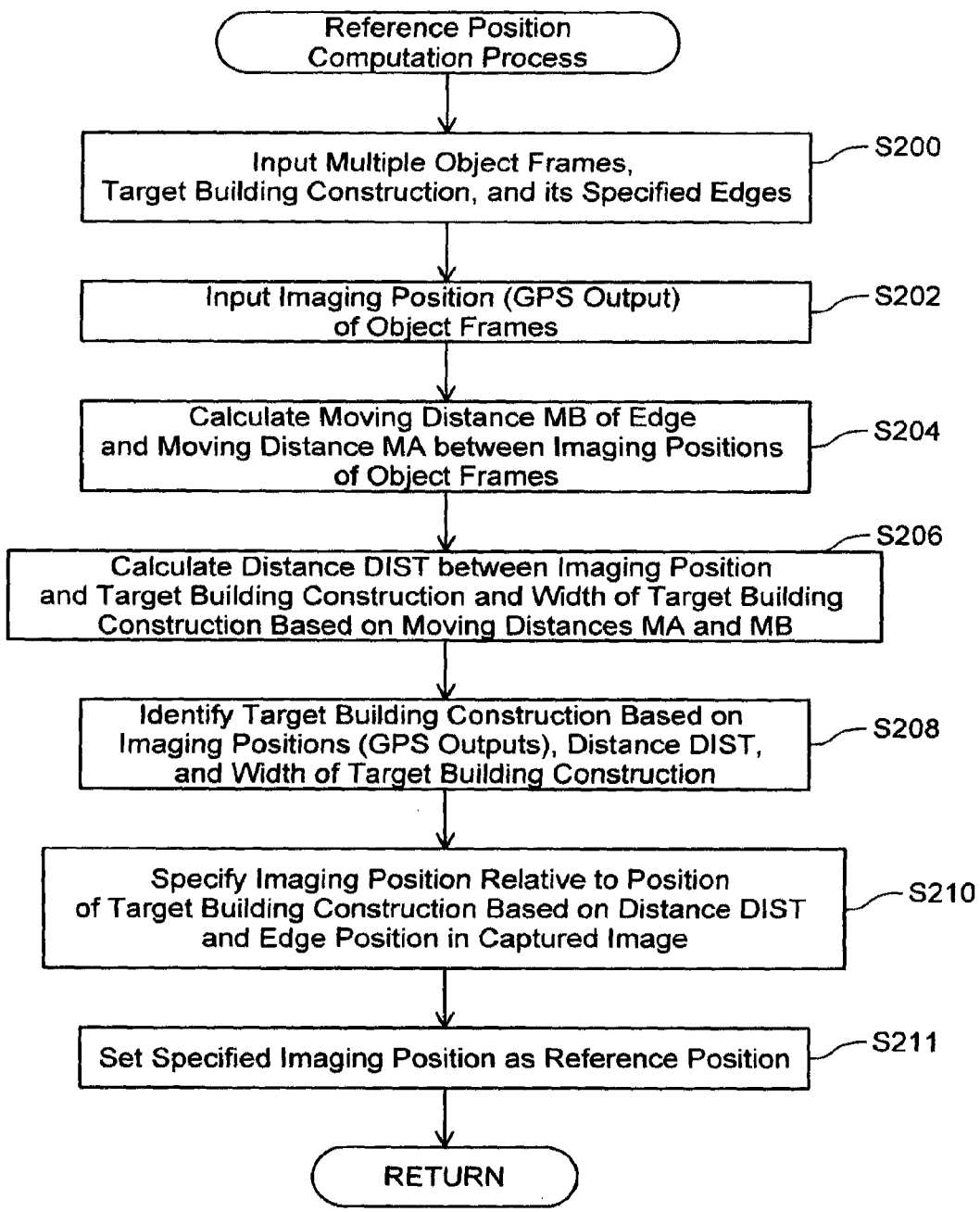
FIG. 17 is a flowchart showing a reference position computation process in this modified example.

FIG. 17 is a flowchart showing a reference position computation process in this modified example. The image data processing device 200 executes a series of processing to determine the reference position according to the procedure described above with reference to FIG. 16. The image data processing device 200 first inputs multiple object frames, a target building construction as an object of analysis, and specified edges of the target building (step S200). The image data processing device 200 also inputs the imaging position of the object frames detected by the GPS (step S202).

The image data processing device 200 then calculates the moving distance MB of an edge between the object frames and the moving distance MA of the imaging positions (see FIG. 16) (step S204), and computes the distance DIST between the imaging position and the target building construction and the width of the target building construction based on the moving distances MA and MB (step S206). The image data processing device 200 refers to the network database 220 (see FIG. 1) and identifies a building construction satisfying the imaging positions (GPS outputs), the computed distance DIST, and the computed width as the target building construction (step S208).

The position coordinates of the identified target building construction are obtained from the network database 220. The image data processing device 200 specifies the imaging position relative to the position of the target building construction, based on the distance DIST and the positions of the edges in the captured image (step S210). This step is equivalent to the process of making the difference between the computed position coordinates of the target building construction and the position coordinates obtained from the network database 220 reflected on the imaging position as the GPS output for correction of the error of the imaging position. The image data processing device 200 sets the specified imaging position as the reference position (step S211) and terminates the reference position computation process. The procedure of this modified example effectively eliminates the error of the imaging position based on the position of a selected building construction even when the pedestrian crossing is not usable as the reference position. This desirably enhances the accuracy of analyzing the imaging position of each frame.

G3. Modified Example

Detection of Time Change

The moving image is captured not only for generation of new three-dimensional map data but for maintenance of existing three-dimensional map data. For the latter purpose, the captured moving image is compared with the existing three-dimensional map data to detect any time change, for example, new construction, demolition, and reconstruction as described below.

Figure 18:
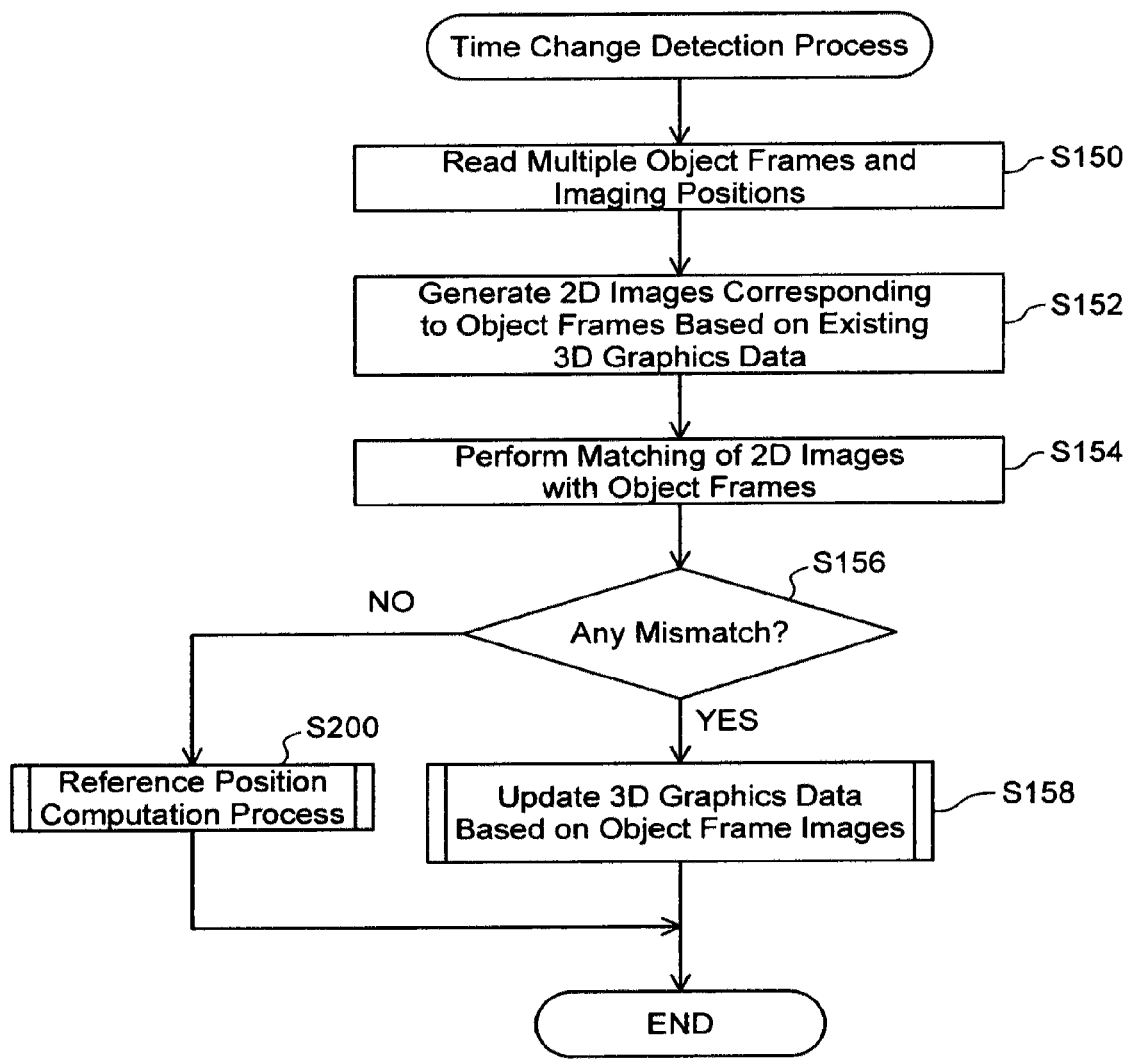
FIG. 18 is a flowchart showing a time change detection process in still another modified example.

FIG. 18 is a flowchart showing a time change detection process in this modified example. The image data processing device 200 first reads multiple object frames and imaging positions (step S150). The multiple object frames are obtained from captured side images, and the imaging positions are the GPS outputs.

The image data processing device 200 refers to existing 3D graphics data as three-dimensional data of building constructions used for generation of three-dimensional map data, and generates 2D images of building constructions seen from the respective imaging positions corresponding to the object images (step S152). The generated 2D images are compared with the corresponding object images for matching (step S154). A known technique, such as a template matching technique, a DP matching technique, or an eigenspace technique, may be adopted for matching of the images. A reference value for matching is set to detect a significant mismatch by new construction, demolishment, or reconstruction between the 2D images and the corresponding object frames.

In the case of no mismatch (step S156), the image data processing device 200 utilizes the object frames for the reference position computation process (step S200) described above with reference to FIG. 17 in the modified example. The captured image of the building construction with no time change enables accurate and stable reference position computation. The reference position computation is, however, not essential but may be omitted when not required. In the case of any mismatch (step S156), on the other hand, the image data processing device 200 updates the 3D graphics data based on the object frames (step S158). In the case of new construction or reconstruction, this update step extracts the texture of the newly constructed or the reconstructed building from the object frame images. In the case of demolishment, this update step deletes data of the demolished building construction. The extraction of the texture and the deletion of the data may be performed automatically or manually with the operator's operations. The time change detection process of the modified example readily detects any time change in the existing 3D graphics data and desirably relieves the loading of maintenance.

G4. Modified Example

Analysis of Guide Plate Position Coordinates

Figure 19:
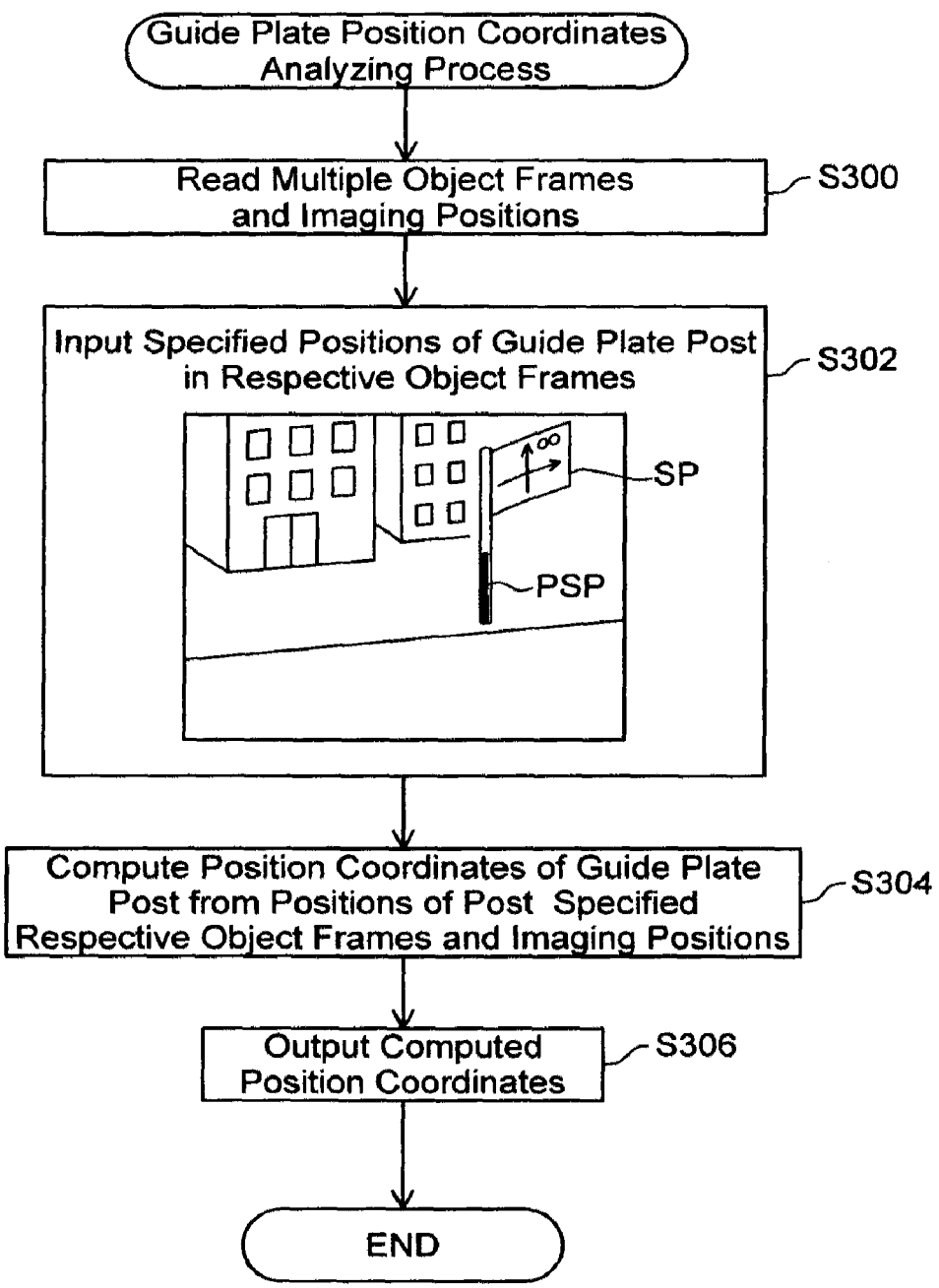
FIG. 19 is a flowchart showing a guide plate position coordinates analyzing process in another modified example.

FIG. 19 is a flowchart showing a guide plate position coordinates analyzing process in another modified example. This process computes the position coordinates of a guide plate located in the town from a captured image. The method of computing the position coordinates of a building construction relative to the imaging position as described previously with reference to FIG. 16 is adopted for computation of the position coordinates of the guide plate.

The image data processing device 200 reads multiple object frames and imaging positions of the respective frames (step S300). The multiple object frames are obtained from captured side images of a guide plate, and the imaging positions are the GPS outputs or the processing results of the embodiment.

The image data processing device 200 subsequently inputs specified positions of the guide plate post in the respective object frames (step S302). In this modified example, the operator draws a line PSP at the position of a guide plate post with a pointing device to specify the position of the guide plate post in each frame of a captured image of a guide plate SP. The position of the guide plate post may otherwise be specified automatically by image analysis.

The image data processing device 200 computes the position coordinates of the guide plate post from the specified positions of the guide plate post in the respective frames and the imaging positions according to the procedure described above with reference to FIG. 16 (step S304). The image data processing device 200 then outputs the computed position coordinates (step S306) and terminates the guide plate position coordinates computation process. One preferable application refers to the network database and ensures the normality of the computed position coordinates. For example, when the computed position coordinates indicate the center of the road or the center of the sidewalk, the result is recognized as abnormal.

The procedure of this modified example facilitates generation of 3D map data with guide plates located at appropriate positions. The accurate position coordinates of the guide plates are not obtainable from the network database or other existing data, although the guide plates are generally located in the vicinity of intersections. The 3D map data with the guide plates located at significantly different positions from the actual positions undesirably confuse the users. In this modified example, the position of a guide plate is readily determinable by simply taking a moving image of the guide plate. The 3D map data with the guide plates located at the appropriate positions are thus generated without the significant load of actually measuring the position coordinates of the guide plates.

The embodiment and its modified examples discussed above are to be considered in all aspects as illustrative and not restrictive. There may be many modifications, changes, and alterations without departing from the scope or spirit of the main characteristics of the present invention. For example, the feature point tracking process is performed based on the lane marking on the road in the above embodiment. Any of other diverse objects captured in multiple frames, for example, the guardrail or a building construction along the road, may be used for the feature point tracking process.

In the embodiment, the vehicle speed pulse is utilized to identify the position in the moving direction. Any of other diverse pieces of information defining the relation of the moving distance of the vehicle and the time may be used for the same purpose. For example, the number of lane markings drawn as dotted lines on the road or the number of posts of the guardrail may be replaced by the vehicle speed pulses.

INDUSTRIAL APPLICABILITY

The technique of the present invention is preferably applicable to analyze the imaging position of each of multiple frames constituting an image, for example, a moving image, captured by a traveling vehicle.

The invention claimed is:

1. An imaging position analyzing device that analyzes an imaging position of each of multiple frames constituting an image, where the image is captured at preset imaging timings during traveling with a substantially fixed attitude angle relative to ground surface, and each of the multiple frames of the image includes a predetermined continuum captured commonly in at least one of adjacent frames immediately before and after the each frame, the imaging position analyzing device comprising:
an input module that inputs image data of the multiple frames;
an initial path input module that inputs an initial path of the traveling as an initial value of analysis;
and an imaging position analyzer that tentatively set imaging positions of the respective frames corresponding to the preset imaging timings along a moving direction of the initial path and correct the tentatively set imaging positions in a perpendicular direction intersecting with the moving direction of the initial path based on a positional misalignment of the predetermined continuum captured in the each frame and at least one adjacent frame of the image, so as to implement analysis of the imaging position of each frame.

2. The imaging position analyzing device in accordance with claim 1, wherein the image is either a front image or a back image in the moving direction, and
the input module inputs image data representing lower image parts of the front image or the back image.

3. The imaging position analyzing device in accordance with claim 1, wherein the image is captured during traveling on a road, and
the predetermined continuum is a road lane marking 4. The imaging position analyzing device in accordance with claim 1, wherein the input module inputs moving distance information representing a relation between a moving distance in the moving direction and an imaging time, and the imaging position analyzer tentatively sets the imaging positions of the respective frames along the moving direction based on the moving distance information.

5. The imaging position analyzing device in accordance with claim 1, wherein the input module inputs moving distance information representing a relation between a moving distance in the moving direction and an imaging time, and the imaging position analyzer extracts frames captured at intervals of a preset moving distance among the multiple frames based on the moving distance information and uses the extracted frames for the analysis of the imaging position of each frame.

6. The imaging position analyzing device in accordance with claim 4, wherein the image is captured by an imaging device mounted on a vehicle, and the moving distance information is a vehicle speed pulse of the vehicle.

7. The imaging position analyzing device in accordance with claim 1, wherein the input module further inputs reference position information in correlation to the image data, where the reference position information represents a time point of reaching a preset reference position during imaging, and the imaging position analyzer performs initialization of at least a location along the moving direction in the course of the analysis, based on the reference position information.

8. The imaging position analyzing device in accordance with claim 1, wherein the image data further includes side image data of plural frames captured in the perpendicular direction, the imaging position analyzer further comprising:

a map data reference module that refers to map data recording position coordinates of a subject included in the side image data; and a coordinates computation module that computes subject coordinates representing a location of the subject from the side image data of the plural frames, wherein the imaging position analyzer performs initialization of at least a location along the moving direction in the course of the analysis, based on the position coordinates recorded in the map data and the computed subject coordinates.

9. The imaging position analyzing device in accordance with claim 1, further comprising:

a network data reference module that refers to road network data representing each road by a combination of nodes and links, wherein the initial path input module sets the initial path based on the road network data.

10. The imaging position analyzing device in accordance with claim 1, wherein the initial path input module receives an output of a position detection sensor, which at least two-dimensionally detects a traveling path of the captured image in a preset error range to set the initial path.

11. The imaging position analyzing device in accordance with claim 1, further comprising:

an image transform processor that converts the image data into a front captured image of the predetermined continuum, prior to the analysis of the imaging position, the image transform processor dividing the image data into multiple regions and adopting different conversion factors in the respective multiple regions to convert the image data, wherein the multiple regions and the conversion factors are set to obtain a front view image of a preset reticulate pattern from image data of the reticulate pattern having a known shape.

12. An imaging position analyzing method, performed by a computer, for analyzing an imaging position of each of multiple frames constituting an image, wherein the image is captured at preset imaging timings during traveling with a substantially fixed attitude angle relative to ground surface, and each of the multiple frames of the image includes a predetermined continuum captured commonly in at least one of adjacent frames immediately before and after the each frame, the imaging position analyzing method comprising:

inputting image data of the multiple frames;

inputting an initial path of the traveling as an initial value of the analysis; and tentatively setting imaging positions of the respective frames corresponding to the preset imaging timings along a moving direction of the initial path, and correcting the tentatively set imaging positions in a perpendicular direction intersecting with the moving direction of the initial path based on a positional misalignment of the predetermined continuum captured in the each frame and at least one adjacent frame of the image, so as to implement analysis of the imaging position of each frame.

13. A non-transitory computer recording medium in which a computer program is recorded, the computer program being executed to analyze an imaging position of each of multiple frames constituting an image, where the image is captured at preset imaging timings during traveling with a substantially fixed attitude angle relative to ground surface, and each of the multiple frames of the image includes a predetermined continuum captured commonly in at least one of adjacent frames immediately before and after the each frame, the computer program recorded in the recording medium comprising:

an input program code of inputting image data of the multiple frames;

an initial path input program code of inputting an initial path of the traveling as an initial value of analysis; and an imaging position analyzing program code of tentatively setting imaging positions of the respective frames corresponding to the preset imaging timings along a moving direction of the initial path and correcting the tentatively set imaging positions in a perpendicular direction intersecting with the moving direction of the initial path based on a positional misalignment of the predetermined continuum captured in the each frame and at least one adjacent frame of the image, so as to implement analysis of the imaging position of each frame.

* * * * *